United States Patent
Turnquist et al.

(10) Patent No.: US 11,511,457 B2
(45) Date of Patent: Nov. 29, 2022

(54) ADDITIVELY PRINTED CEMENTITIOUS STRUCTURES AND METHODS OF MANUFACTURING SAME

(71) Applicant: General Electric Company, Schenectady, NY (US)

(72) Inventors: Norman Arnold Turnquist, Carlisle, NY (US); Daniel Jason Erno, Clifton Park, NY (US); Gregory Edward Cooper, Greenfield Center, NY (US); James Robert Tobin, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/279,871

(22) PCT Filed: Sep. 28, 2018

(86) PCT No.: PCT/US2018/053431
§ 371 (c)(1),
(2) Date: Mar. 25, 2021

(87) PCT Pub. No.: WO2020/068115
PCT Pub. Date: Apr. 2, 2020

(65) Prior Publication Data
US 2022/0032497 A1  Feb. 3, 2022

(51) Int. Cl.
*B28B 1/00* (2006.01)
*B33Y 10/00* (2015.01)
*F03D 13/20* (2016.01)

(52) U.S. Cl.
CPC .............. *B28B 1/001* (2013.01); *B33Y 10/00* (2014.12); *F03D 13/20* (2016.05)

(58) Field of Classification Search
CPC ........... B28B 1/001; B28B 3/20; B33Y 10/00; B33Y 80/00; F03D 13/20; E04H 12/12;
(Continued)

(56) References Cited

U.S. PATENT DOCUMENTS 8,778,479 B2  7/2014  Bech
9,331,534 B2  5/2016  Yost
(Continued)

FOREIGN PATENT DOCUMENTS

EP  3118394 A1  1/2017
WO  WO2016/019434 A1  2/2016
(Continued)

OTHER PUBLICATIONS

PCT International Search Report and Written Opinion Corresponding to PCT/US2018/053431 dated Jun. 14, 2019.
(Continued)

*Primary Examiner* — Alexander M Weddle
(74) *Attorney, Agent, or Firm* — Dority & Manning, P.A.

(57) ABSTRACT

Methods of manufacturing a cementitious structure, such as a structure for supporting a wind turbine, include additively printing, via an additive printing device, one or more contours that include a cementitious material so as to form a cementitious structure in a layer by layer manner such that a first portion of the plurality of contours comprises a first plurality of contour coupling features that engage with a second plurality of contour coupling features of a second portion of the plurality of contours.

17 Claims, 23 Drawing Sheets

(58) Field of Classification Search
CPC .............. E04H 12/34; E04G 2021/049; E04G 21/0463
See application file for complete search history.

(56) References Cited

U.S. PATENT DOCUMENTS

| | | |
|---|---|---|
| 2010/0257792 A1 | 10/2010 | Khoshnevis |
| 2012/0159785 A1 | 6/2012 | Pyles et al. |
| 2015/0300036 A1* | 10/2015 | Khoshnevis ........ E04G 21/0463 425/63 |
| 2015/0367375 A1 | 12/2015 | Page |
| 2017/0016244 A1 | 1/2017 | Keller et al. |
| 2017/0225445 A1 | 8/2017 | Gardiner |
| 2017/0305034 A1 | 10/2017 | Grivetti et al. |
| 2018/0071949 A1* | 3/2018 | Giles ................... E04G 21/0463 |

FOREIGN PATENT DOCUMENTS

| | | |
|---|---|---|
| WO | WO2016/055222 A1 | 4/2016 |
| WO | WO2017/092766 A1 | 6/2017 |

OTHER PUBLICATIONS

Gosselin et al., Large-Scale 3D Printing of Ultra-High Performance Concrete—A New Processing Route for Architects and Builders, Materials & Design, vol. 100, Jun. 15, 2016, pp. 102-109.
Quigley, A Few Ways to Strengthen 3D Printed Parts, www.3ders.org , 3D Printer and 3D Printing News, Oct. 10, 2014, http://www.3ders.org/articles/20141010-a-few-ways-to-strengthen-3d-printed-parts.html.
Zareiyan et al., Effects on Interlocking on Interlayer Adhesion and Strength of Structures in 3D Printing of Concrete, Automation in Construction, ResearchGate, vol. 83, Nov. 2017, pp. 212-221. https://www.researchgate.net/publication/319162312_Effects_of_interlocking_on_interlayer_adhesion_and_strength_of_structures_in_3D_printing_of_concrete.

* cited by examiner

1500

```
┌─────────────────────────────────────────────────────────────┐
│ RECEIVING, VIA AN ADDITIVE PRINTING DEVICE, MACHINE-EXECUTABLE │ ─ 1508
│ INSTRUCTIONS FROM A PRINT CONTROLLER                           │
└─────────────────────────────────────────────────────────────┘
                              ↓
┌─────────────────────────────────────────────────────────────┐
│ ORIENTING, VIA A ROBOTIC ARM, ONE OR MORE NOZZLES OF THE ADDITIVE │ ─ 1510
│ PRINTING DEVICE WITH RESPECT TO A TOOLPATH WHILE EXTRUDING THE    │
│ CEMENTITIOUS MATERIAL FROM ONE OR MORE NOZZLES, IN WHICH THE      │
│ ORIENTING AND THE EXTRUDING PERFORMED ACCORDING TO                │
│ MACHINE-EXECUTABLE INSTRUCTIONS                                    │
└─────────────────────────────────────────────────────────────┘
                              ↓
┌─────────────────────────────────────────────────────────────┐
│ FORMING THE CEMENTITIOUS EXTRUDATE AT LEAST IN PART BY EXTRUDING │ ─ 1506
│ CEMENTITIOUS MATERIAL FROM ONE OR MORE NOZZLES OF THE ADDITIVE   │
│ PRINTING DEVICE                                                   │
└─────────────────────────────────────────────────────────────┘
                              ↓
┌─────────────────────────────────────────────────────────────┐
│ ADDITIVELY PRINTING, VIA AN ADDITIVE PRINTING DEVICE, A PLURALITY OF │
│ CONTOURS COMPRISING A CEMENTITIOUS EXTRUDATE SO AS FORM A            │
│ CEMENTITIOUS STRUCTURE IN A LAYER BY LAYER MANNER SUCH THAT A FIRST  │ ─ 1502
│ PORTION OF THE PLURALITY OF CONTOURS COMPRISES A FIRST PLURALITY OF  │
│ CONTOUR COUPLING FEATURES THAT ENGAGE WITH A SECOND PLURALITY OF     │
│ CONTOUR COUPLING FEATURES OF A SECOND PORTION OF THE PLURALITY OF    │
│ CONTOURS                                                              │
└─────────────────────────────────────────────────────────────┘
              ↓   ↓   ↓   ↓   ↓   ↓   ↓   ↓
             (A) (B) (C) (D) (E) (F) (G) (H)
              ↓   ↓   ↓   ↓   ↓   ↓   ↓   ↓
┌─────────────────────────────────────────────────────────────┐
│ EXTRUDING CEMENTITIOUS MATERIAL SO AS TO PROVIDE A CONTOUR THAT │ ─ 1504
│ FOLLOWS A SERPENTINE PATH WHILE ALLOWING CURRENTLY-EXTRUDING     │
│ CEMENTITIOUS MATERIAL TO REMAIN ON THE TOP OF ALREADY EXTRUDING  │
│ CEMENTITIOUS MATERIAL                                             │
└─────────────────────────────────────────────────────────────┘
```

FIG. 15A

ADDITIVELY PRINTED CEMENTITIOUS STRUCTURES AND METHODS OF MANUFACTURING SAME

FIELD

The present disclosure relates in general to additively printed cementitious structures such as additively printed concrete wind turbine towers, and methods of printing such cementitious structures.

BACKGROUND

Cementitious structures such as concrete wind turbine towers may be additively printed using automated deposition or 3D printing technologies, in which one or more nozzles that have multiple degrees of freedom deposit successive layers of cementitious materials under computer control according to a reference model or the like. Wind turbine towers may be of particular interest for manufacturing using additive printing technology. Wind power is considered one of the cleanest, most environmentally friendly energy sources presently available, and wind turbines have gained increased attention in this regard. Increases in the size and power output of wind turbines requires increasingly larger, taller towers to hold such wind turbines. Concrete and other cementitious materials have shown to be an economical alternative or supplement to steel tubular tower segments, and additive printing offers advantages in printing the towers on-site so as to avoid shipping costs and logistical challenges associated with delivering pre-fabricated tower segments to construction sites. These advantages apply similarly to nearly any cementitious structure, particularly cementitious structures to be fabricated at remote locations, which is commonly the case for wind turbine towers as well as other structures such as towers or pylons for power lines, telecom or microwave relay equipment, and so forth.

To fabricate a tower, pylon, or other structure using additive printing, generally one or more nozzles extrude a cementitious material in a layer-by-layer manner. Oftentimes the cementitious material may be formulated so as to exhibit a relatively short curing time so that as subsequent layers are additively printed on top of one another, the previous layer or layers will have sufficient rigidity to support the next subsequent layer or layers.

Typically, cementitious materials such as concrete cure through a chemical reaction called hydration, whereby water reacts with calcium silicate and other hydration products form crystals which give cured cementitious materials their hardness. With additive printing, the degree to which previous layers have cured impacts interlayer crystallization. Hydration products may form crystals that grow across interlayer boundaries and thereby bond layers to one another though interlayer crystallization. However, as a layer cures, the availability of cementitious material for such interlayer crystallization decreases. Plus, the formation of crystals during hydration may physically block pathways for such interlayer crystallization.

Accordingly, there exists a need for improved additively printed cementitious structures such as improved additively printed concrete wind turbine towers, as well as improved methods of printing such cementitious structures.

BRIEF DESCRIPTION

Aspects and advantages will be set forth in part in the following description, or may be obvious from the description, or may be learned through practice of the presently disclosed subject matter.

In one aspect, the present disclosure embraces additive printing devices. In another aspect, the present disclosure embraces cementitious structures additively printed using an additive printing device. In yet another aspect, the present disclosure embraces methods of manufacturing a cementitious structure, such as a structure for supporting a wind turbine. Exemplary methods include additively printing, via an additive printing device, one or more contours that include a cementitious material so as to form a cementitious structure in a layer by layer manner such that a first portion of the plurality of contours comprises a first plurality of contour coupling features that engage with a second plurality of contour coupling features of a second portion of the plurality of contours.

These and other features, aspects and advantages of the present disclosure will become better understood with reference to the following description and appended claims. The accompanying drawings, which are incorporated in and constitute a part of this specification, illustrate embodiments and, together with the description, serve to explain the principles of the presently disclosed subject matter.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIGS. 15A-15D show flowcharts illustrating exemplary methods of additively printing a cementitious structure.

DETAILED DESCRIPTION

Figure 1:
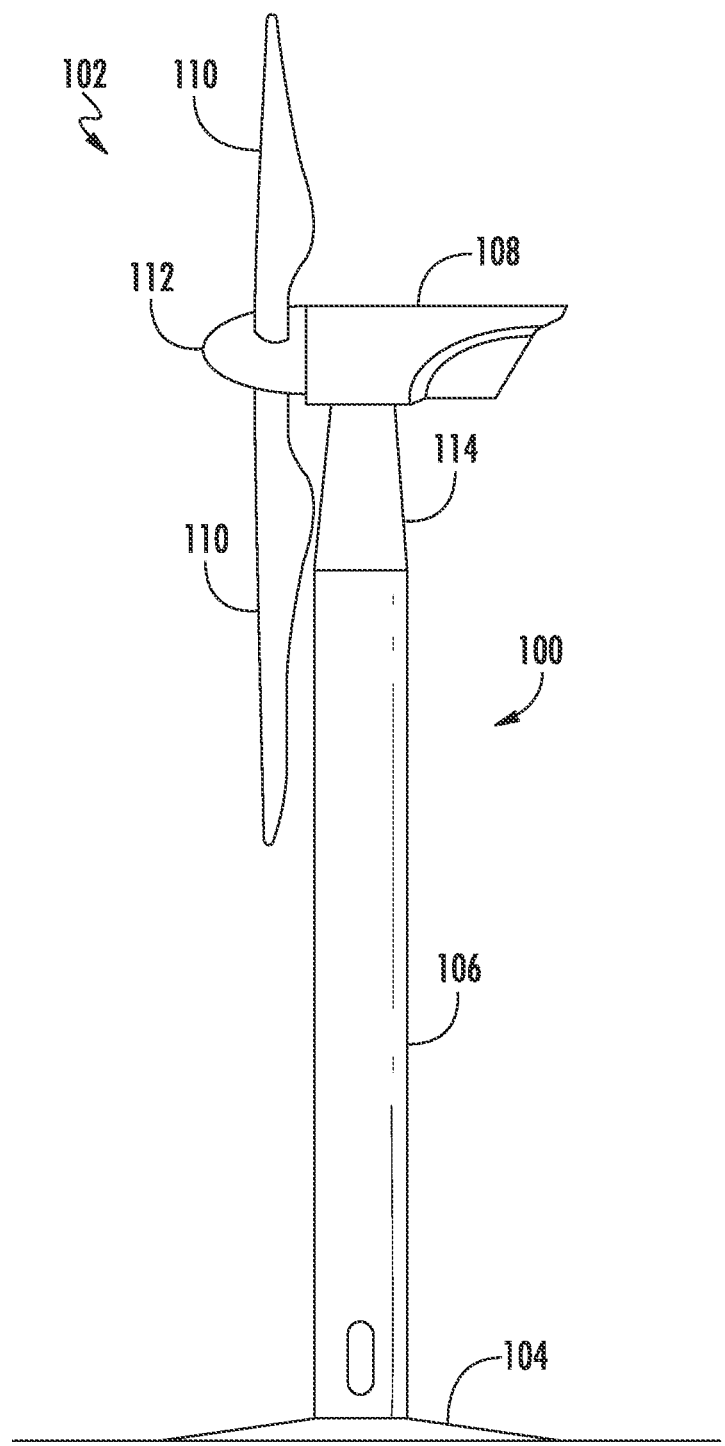
FIG. 1 illustrates a perspective view of a wind turbine mounted on a tower that includes an additively printed cementitious structure.

Reference now will be made in detail to embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

Generally, the present disclosure pertains to additively printed cementitious structures, such as concrete wind turbine towers as well as other cementitious structures, and methods of additively printing such cementitious structures. The cementitious structures include contours with contour coupling features that engage with one another. Such contour coupling features that engage with one another may nest, mate, overlap, and/or interlock or otherwise engage with one another. These contour coupling features provide mechanically-coupling interfaces that may supplement interlayer bonding through crystallization of hydration products in the cementitious material.

One or more adjacent contours may be additively printed using a cementitious material in a manner that minimizes void spaces between adjacent contours while also including contour coupling features that nest, mate, overlap, and/or interlock or otherwise engage with adjacent contours or adjacent portions of a contour. A first one or more contours or a portion thereof may be additively printed from a cementitious material so as to include a first plurality of contour coupling features. The cementitious material may have a relatively low slump such that the printed cementitious material generally retains its extruded shape. A second one or more contours or a portion thereof may be subsequently or concurrently additively printed from a cementitious material adjacent to the first one or more contours or a portion thereof, such that the second one or more contours or a portion thereof may nest, mate, overlap, and/or interlock or otherwise engage with the first one or more contours or a portion thereof. The cementitious material forming the second one or more contours or a portion thereof may similarly have a relatively low slump such that the printed cementitious material generally retains its extruded shape; however, the cementitious material generally also exhibits sufficient flowability such that the extruded cementitious material sufficiently flows up to and against adjacent contours and/or contour coupling features thereof.

In this way, one or more contours may be additively printed using a cementitious material so as to form a cementitious structure in a layer by layer manner such that a first portion of the one or more contours having a first plurality of contour coupling features engage with a second plurality of contour coupling features of a second portion of the one or more contours. The first portion of the one or more contours may be additively printed prior to or concurrently with the second portion of the one or more contours, and regardless of the order, sequence, or timing with which the one or more contours are printed, the cementitious material may have a sufficient combination of flowability and slump such that contours may be additively printed adjacent to and abutting one another in a manner that allows the cementitious material to flow up to/against the first portion of the one or more contours and/or into/around the first plurality of contour coupling features so as to minimize void spaces between adjacent contours. In some embodiments, the first portion of the one or more contours may partially cure prior to additively printing the second portion of the one or more contours, and the second portion of the one or more contours may flow up to, against, into, and/or around the first portion of the one or more contours, enveloping space adjacent to the first portion of one or more contours and/or first plurality of contour coupling features.

Additionally, the present disclosure pertains to additively printed cementitious structures with contours adhered to one another with an adhesive formulation. Such an adhesive formulation may further supplement interlayer bonding between contours. The present disclosure additionally pertains to additive printing devices for additively printing such cementitious structures, and methods of additively printing cementitious structures using cementitious material, and optionally an adhesive.

As examples, a cementitious material includes lime or calcium silicate based hydraulically setting materials such as Portland cement, fly ash, blast furnace slag, pozzolan, limestone fines, gypsum, or silica fume, as well as combinations of these. In some embodiments, a cementitious material may additionally or alternatively include non-hydraulic setting material, such as slaked lime and/or other materials that harden through carbonation. Cementitious materials may be combined with fine aggregate (e.g., sand) to form mortar, or with rough aggregate (sand and gravel) to form concrete. A cementitious material may be provided in the form of a slurry, which may be formed by combining any one or more cementitious materials with water, as well as other known additives, including accelerators, retarders, extenders, weighting agents, dispersants, fluid-loss control agents, lost-circulation agents, strength-retrogression prevention agents, free-water/free-fluid control agents, expansion agents, plasticizers (e.g., superplasticizers such as polycarboxylate superplasticizer or polynaphthalene sulfonate superplasticizer), and so forth. The relative amounts of respective materials to be provided in a cementitious material may be varied in any manner to obtain a desired effect. In slurry form, exemplary cementitious materials may include from 25 to 70 wt. % water, such as from 33 to 65 wt. % water, such as from 45 to 60 wt. % water.

The cementitious material (e.g., a slurry of cementitious material) may be extruded or printed using one or more printing tools of an additive printing device, providing cementitious material in the form of a cementitious extrudate which may cure to form cured cementitious material. The presently disclosed wind turbine towers and other structures may be additively printed using any cementitious material, and all such materials are within the spirit and scope of the present disclosure.

An adhesive formulation may be utilized between contours or between layers of a cementitious structure. Exemplary adhesive formulations include cementitious material such as mortar, polymeric materials, and/or admixtures of cementitious material and polymeric material. Adhesive formulations that include cementitious material are referred to herein as "cementitious mortar." Cementitious mortar may include any cementitious material, which may be combined with fine aggregate. Cementitious mortar made using Portland cement and fine aggregate is sometimes referred to as "Portland cement mortar," or "OPC". Adhesive formulations that include an admixture of cementitious material and polymeric material are referred to herein as "polymeric mortar." Any cementitious material may be included in an admixture with a polymeric material, and optionally, fine aggregate. Adhesive formulations that include a polymeric material are referred to herein as "polymeric adhesive."

Exemplary polymeric materials that may be utilized in an adhesive formulation include may include any thermoplastic or thermosetting polymeric material, such as acrylic resins, polyepoxides, vinyl polymers (e.g., polyvinyl acetate (PVA), ethylene-vinyl acetate (EVA)), styrenes (e.g., styrene butadine), as well as copolymers or terpolymers thereof. Characteristics of exemplary polymeric materials are described in ASTM C1059/C1059M-13, Standard Specification for Latex Agents for Bonding Fresh To Hardened Concrete.

Suitable acrylic resins include acrylate polymers, such as methacrylates, poly(methyl acrylate), poly(methyl methacrylate), and poly(acrylonitrile), as well as acrylic acids, methacrylic acids, and esters of these acids, and combinations of any one or more of the foregoing.

Suitable polyepoxides include bisphenol A epoxy resin, bisphenol F epoxy resin, cycloaliphatic epoxy resin, epoxidized novolacs, and glycidylamine epoxy resin, as well as combinations of these.

A polyepoxide may optionally be combined with a curing agent selected to cause homopolymerization (e.g., via an anionic or cationic catalyst) and/or copolymerization with the curing agent. Exemplary curing agents suitable for use with a polyepoxide include amines, acids, acid anhydrides, phenols, alcohols, and thiols. For example, suitable amines include aliphatic polyamines, alicyclic polyamines, aromatic polyamines, polyamino amides. The amount of curing agent may be determined by a factor of the active hydrogen equivalent of the curing agent with the epoxy groups in the polyepoxide, which factor may be from 0.3 to 5 times by weight of the active hydrogen equivalent of the epoxy groups, such as from 0.8 to 1.2 times, such as from 0.5 to 1.0 times by weight, such as from 1.0 to 2.0 times by weight, such as from 2.0 5.0 times by weight of the active hydrogen equivalent of the epoxy groups.

An adhesive formulations may be formed by combining cementitious mortar, polymeric mortar, and/or polymeric adhesive water, as well as other known additives, including accelerators, retarders, extenders, weighting agents, dispersants, fluid-loss control agents, lost-circulation agents, strength-retrogression prevention agents, free-water/free-fluid control agents, expansion agents, plasticizers (e.g., superplasticizers such as polycarboxylate superplasticizer or polynaphthalene sulfonate superplasticizer), and so forth.

The relative amounts of respective materials to be provided in an adhesive formulation may be varied in any manner to obtain a desired effect. Exemplary cementitious mortar may include from 50 to 99 wt. % water, such as from 60 to 90 wt. % water, such as from 70 to 80 wt. % water, such as from 80 to 90 wt. % water, such as from 90 to 99 wt. % water, with the balance including one or more cementitious materials, fine aggregate, and optionally one or more additives.

Exemplary polymeric mortar may include from 20 to 99 wt. % water, such as from 30 to 90 wt. % water, such as from 40 to 80 wt. % water, such as from 50 to 70 wt. % water, such as from 60 to 80 wt. % water, such as from 70 to 80 wt. % water, such as from 80 to 90 wt. % water, such as from 90 to 99 wt. % water, with the balance including one or more cementitious materials, one or more polymeric materials, optionally, fine aggregate, and optionally, one or more additives. The cementitious material included in a polymeric mortar may be an amount from 1 to 50 wt. %, such as from 5 to 40 wt. %, such as from 5 to 20 wt. %, such as from 10 to 30 wt. %, such as from 20 to 40 wt. %. The polymeric material included in a polymeric mortar may be an amount from 0.1 to 99 wt. %, such as from 1 to 99 wt. %, such as from 5 to 95 wt. %, such as from 1 to 10 wt. %, such as from 10 to 25 wt. %, such as from 25 to 50 wt. %, such as from 40 to 60 wt. %, such as from 40 to 80 wt. %, such as from 50 to 70 wt. %, such as from 60 to 80 wt. %, such as from 80 to 90 wt. %.

Exemplary polymeric adhesives may include one or more polymeric materials dispersed in water. The polymeric material included in the polymeric adhesive may be an amount from 0.1 to 99 wt. %, such as from 1 to 99 wt. %, such as from 5 to 95 wt. %, such as from 1 to 10 wt. %, such as from 10 to 25 wt. %, such as from 25 to 50 wt. %, such as from 40 to 60 wt. %, such as from 40 to 80 wt. %, such as from 50 to 70 wt. %, such as from 60 to 80 wt. %, such as from 80 to 90 wt. %.

Referring now to the drawings, various embodiments of the present disclosure will be described in further detail. FIG. 1 shows one embodiment of an additively printed cementitious structure 100. The presently disclosed cementitious structures 100 may include towers, pylons, trusses, girders, footings, columns, platforms, or the like. As shown, the cementitious structure 100 is supporting a wind turbine 102 mounted on the cementitious structure 100. The presently disclosed cementitious structures 100 may be used not only for supporting a wind turbine 102; but rather, exemplary cementitious structures may also or alternatively be used for supporting power lines, telecom or microwave relay equipment, and so forth. Further exemplary cementitious structures 100 may be utilized in the construction of buildings, bridges, homes, as well as other structures. It should be appreciated that these examples are no to be limiting, but rather, that the present disclosure is applicable to cementitious structures in numerous contemplated settings, all of which are within the spirit and scope of the present disclosure. Further, it will be appreciated that the methods described herein may apply to additively printing any such cementitious structure 100.

Cementitious structures 100 such as the wind turbine tower shown in FIG. 1 may include one or more segments, all or a portion of which may be additively printed using a cementitious material. For example, a cementitious structure 100 may include a foundation or footing 104 and one or more columns 106. In some embodiments at least a portion of the cementitious structure 100 may include a steel segment, such that the cementitious structure 100 includes at least one additively printed cementitious segment and at least one steel segment. For example, the cementitious structure 100 shown in FIG. 1 may include a steel segment 114 such as a turbine-mounting segment, which may be situated atop the cementitious structure 100 such as atop one or more columns 106. Also, the additively printed cementitious structure 100 may include reinforcing material, such as steel beams, rebar, and the like. The wind turbine 102 shown in FIG. 1 represents a typical horizontal-axis wind turbine 102. Typically, such a wind turbine 102 includes an electrical generator (not shown) surrounded by a nacelle 108, and a plurality of rotor blades 110 and a rotor hub 112 coupled to a main rotor shaft of the electrical generator. The example shown in FIG. 1 is provided for illustrative purposes only, and it will be appreciated that the present disclosure is not limited to any particular type of wind turbine 102.

Figure 2A:
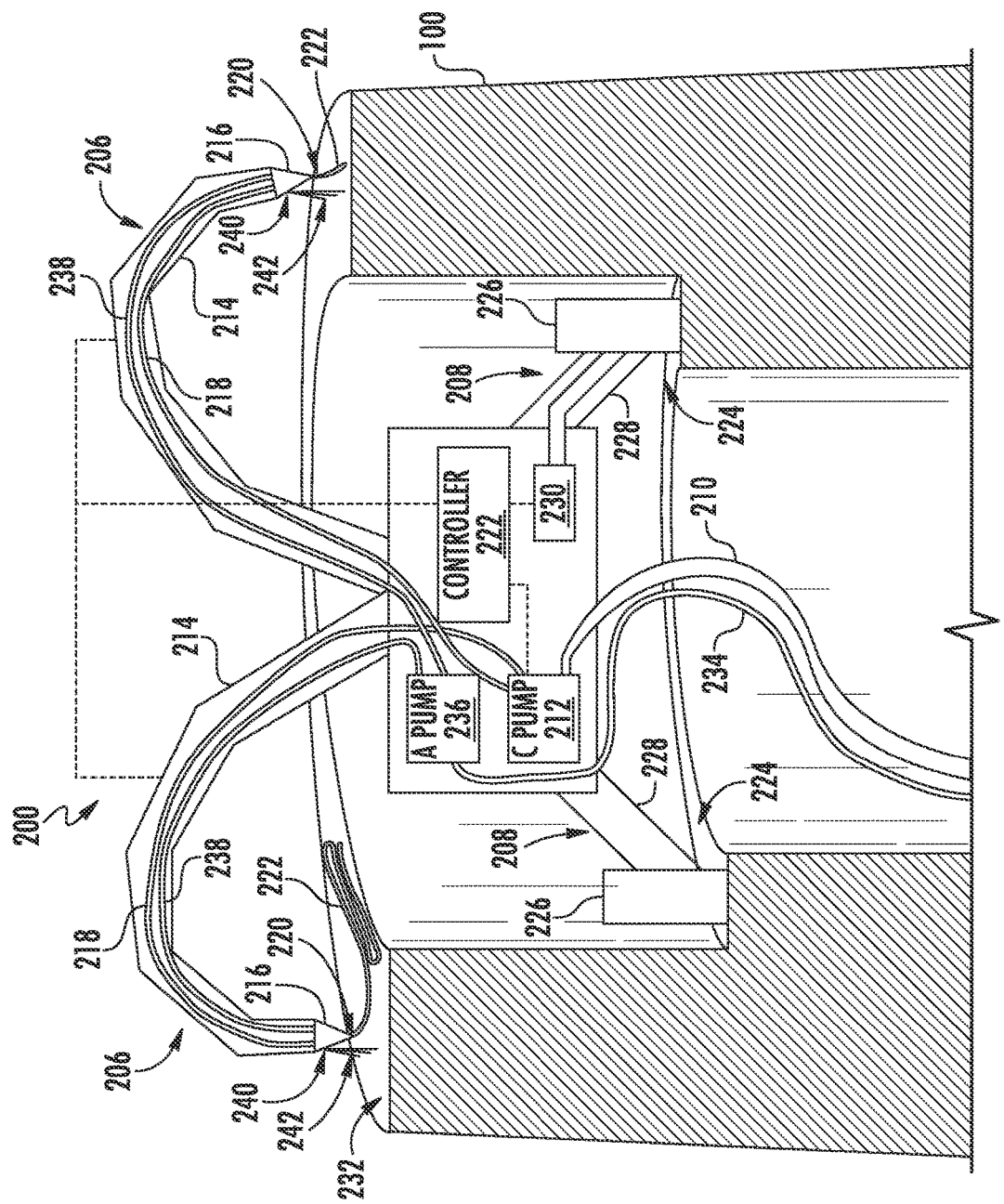
FIG. 2A illustrates a schematic diagram showing an exemplary additive printing device during additively printing a cementitious structure, with the cementitious structure shown in cutaway view.

Referring now to FIG. 2A, an exemplary additive printing device 200 is shown. The additive printing device 200 may be utilized to additively print any cementitious structure 100 in accordance with the present disclosure. It will be appreciated that the additive printing device 200 represents merely one embodiment that may be used to additively print a cementitious structure 100 and is not to be limiting. Other additive printing devices are contemplated, and any such other additive printing device may be utilized to additively print a cementitious structure 100 without departing from the spirit and scope of the present disclosure. Such other additive printing devices may also be utilized to perform the presently disclosed methods of additively printing a cementitious structure, all of which are within the spirit and scope of the present disclosure.

Suitable additive printing devices 200 include one or more printing tools configured to print cementitious material on a surface under automated control from an additive printing controller 202. The additive printing controller 202 may be configured to cause the additive printing device 200 to orient the one or more printing tools according to respective toolpaths and to extrude cementitious material during movement along at least a portion of the respective toolpaths so as to print a series of sequential contours that make up the cementitious structure 100. A contour represents a three-dimensional space where the cementitious material is extruded when printing, such as in a layer by layer manner. When printing the contours, the one or more printing tools move back and forth according to machine-executable instructions from the printing controller 202 while extruding a cementitious material. As sequential contours of cementitious material are additively printed on top of one another, the cementitious structure 100 begins to take its form. The additive printing device 200 may continue to print sequential contours until the cementitious structure 100 has been completed.

When printing a contour of cementitious material, typically the cementitious material will be in the form of a slurry that has a sufficiently thick consistency such that the cementitious material exhibits flowability for purposes of pumping to the cementitious material to the one or more printing tools and extruding the cementitious material from the printing tools. However, when printed, the wet cementitious material extruded from the printing tool (cementitious extrudate) preferably exhibits relatively low slump such that the printed cementitious material generally retains its extruded shape. A suitable degree of slump for the wet cementitious material may be ascertained according to standard test methods such as, for example, ASTM C 143, Standard Test Method for Slump of Hydraulic-Cement Concrete, or counterpart European Standard test BS EN 12350-2; ASTM C 685, Standard Specification for Concrete Made by Volumetric Batching and Continuous Mixing; and/or ASTM C 1116, Standard Specification for Fiber-Reinforced Concrete, as applicable.

Still referring to FIG. 2A, an exemplary additive printing device 200 includes a chassis 204, one or more printing tools 206, and one or more support members 208. Cementitious material may be pumped to the additive printing device 200 via a cementitious material supply line 210 such as a hose or flexible pipe in fluid communication with a feed source (not shown) such as a hopper, mixer, or the like. A cementitious material pump 212 may be located within the additive printing device 200 for pumping the cementitious material to the one or more printing tools 206. The cementitious material pump 212 may also operate to pump the cementitious material from the feed source. Additionally or alternatively, a separate pump (not shown) may be provided to pump the cementitious material to the additive printing device 200.

Exemplary printing tools 206 of an additive printing device 200 include an robotic arm 214 operable by pneumatics or the like, and a print head 216 disposed at the end of the robotic arm 214. A print line 218 such as a hose or flexible pipe may provide fluid communication from the cementitious material pump 212 to the print head 216. The print head 216 may include one or more cementitious material nozzles 220 configured to extrude cementitious material, forming a cementitious extrudate 222. The cementitious material pump 212 may operate according to machine-executable instructions from the print controller 202 so as to feed the cementitious material to the one or more printing tools 206, and the one or more printing tools 206 may operate according to machine-executable instructions from the print controller 202 so as to move according to respective toolpaths. For example, the print controller 202 may cause an robotic arm 214 of a printing tool 206 to move so as to guide one or more print heads 216 and/or one or more cementitious material nozzles 220 along a toolpath. The cementitious material pump 212 and the one or more printing tools 206 may work in concert according to machine-executable instructions from the print controller 202 to print sequential contours that make up a cementitious structure 100.

While the printing tools 206 of the additive printing device 200 extrude cementitious material, the support members 208 are configured to support the chassis 204 of the additive printing device 200. The support members 208 may be configured to allow the chassis 204 to move with respect to the cementitious structure 100 as the sequential contours are printed, for example, to keep the growing cementitious structure 100 within reach of the printing tools 206. In some embodiments, the support member 208 may be configured to allow the additive printing device 200 to climb the cementitious structure 100 as the cementitious structure 100 grows. For example, as shown in FIG. 2A, the additive printing device 200 may print the cementitious structure 100 in such a manner so as to provide one or more ledges 224 to support the additive printing device 200. In some embodiments, the one or more ledges 224 may be a separately printed feature of the cementitious structure 100 specifically for the purpose of providing a way for the additive printing device 200 to climb the cementitious structure 100. Alternatively, the one or more ledges 224 may be a portion of the cementitious structure 100, without requiring any separately printed ledge-like features. In either embodiment, the one or more ledges 224 may be configured such that the support members 208 may move along the one or more ledges 224 as the one or more printing tools 206 extrude sequential contours of cementitious material.

In some embodiments, a support member 208 may include a wheel 226 coupled to the chassis 204 by an axle 228. Alternatively, a support member 208 may include articulating legs 228 and feet 226. When support members 208 include wheels 226, the wheels 226 may roll along the one or more ledges 224 as the one or more printing tools 206 extrude sequential contours of the cementitious structure 100. When support members 208 include articulating legs 228 and feet 226, the support members 208 may "walk" along the one or more ledges 224 as the one or more printing tools 206 extrude sequential contours of the cementitious structure 100. As shown, the one or more ledges 224 may be sloped so as to allow the wheels 226 roll along the one or more ledges 224. Regardless of the particular form of the support members 208, a power source 230 such as an electric motor or an internal combustion engine may provide power for moving the support members 208 by way of pneumatics, a drive shaft, or the like, thereby allowing the additive printing device 200 to climb the cementitious structure 100 under such power. Alternatively, an additive printing device may be moved (e.g., rolled) along the one or more ledges under external power, such as using a wench, crane, human operator, or the like.

The additive printing device 200 may extrude sequential contours of the cementitious structure 100 at a rate that allows a previously extruded contour or contours to have sufficient rigidity to support the next subsequent contour or contours. When using an additive printing device 200 that is configured to climb the cementitious structure 100, the additive printing device 200 may extrude sequential contours of the cementitious structure 100 at a rate that allows the previously extruded contour or contours to have sufficient rigidity to support the additive printing device 200. An additive printing device 200 may also be situated on the ground or scaffolding or the like in addition or as an alternative to providing one or more ledges 224. In some embodiments, the additive printing device 200 may print continuously, extruding a continuous contour at a rate that allows the previously extruded portions of the contour to develop sufficient rigidity as the overlapping contours are applied. Alternatively, or in addition, the additive printing device 200 may pause from time to time to give the contours additional time to cure before printing additional contours on top of them.

The additive printing device 200 may extrude one or more contours on a build surface 232 of the cementitious structure 100 with the support members 208 situated on one or more ledges 224, supporting the additive printing device 200 on the cementitious structure 100. The build surface 232 refers to the area where one or more contours are being printed or are to be printed, and may include one or more regions of the cementitious structure 100, including regions of the one or more ledges 224. The build surface 232 and/or the one or more ledges 224 may alternate between different regions of the cementitious structure 100. For example, the support members 208 may be positioned on a first portion of one or more ledges 224 while the printing tool(s) 206 extrude the cementitious material on a second portion of the one or more ledges 224. The freshly extruded cementitious material on the second portion of the one or more ledges 224 may need time to at least partially cure before supporting the weight of the additive printing device 200. Meanwhile, the printing tool(s) 206 may extrude cementitious material on the build surface 232. Later, the support members 208 may move to the second portion of the one or more ledges after the freshly extruded cementitious material on the second portion of the one or more ledges 224 has sufficiently cured. Then, the printing tools(s) may extrude the cementitious material on the first portion of the one or more ledges 224 with the support members 208 having moved from the first portion to the second portion of the ledges 224. Again, meanwhile, the printing tool(s) 206 may extrude cementitious material on the build surface 232 while allowing the freshly extruded cementitious material on the first portion of the one or more ledges 224 to sufficiently cure. The additive printing device may continue in this manner to grow the cementitious structure 100 to completion.

Still referring to FIG. 2A, in some embodiments, an additive printing device 200 may be configured to apply an adhesive formulation to the cementitious extrudate 222 and/or the build surface 232 in connection with at least a portion of the additive printing process, such as before, during, and/or after printing one or more contours. The adhesive formulation may be configured to supplement interlayer bonding between contours. The adhesive formulation may be applied directly to the build surface 232, so as to supplement adhesion between the build surface 232 and contours being additively printed thereon. Additionally, or alternatively, the adhesive formulation may be applied to the cementitious extrudate 222 as and/or after the cementitious extrudate 222 extrudes from the one or more print heads 216.

An adhesive formulation may be pumped to the additive printing device 200 via an adhesive supply line 234 such as a hose or flexible pipe in fluid communication with an adhesive formulation feed source (not shown) such as a hopper, mixer, or the like. An adhesive formulation pump 236 may be located within the additive printing device 200 for pumping the adhesive formulation to the one or more printing tools 206. The adhesive formulation pump 236 may also operate to pump the adhesive formulation from the adhesive formulation feed source. Additionally or alternatively, a separate pump (not shown) may be provided to pump the adhesive formulation to the additive printing device 200.

An adhesive line 238 such as a hose or flexible pipe may provide fluid communication from the adhesive formulation pump 236 to the print head 216. The print head 216 may include one or more adhesive formulation nozzles 240 configured to discharge (e.g., spray, apply, etc.) an adhesive formulation 242. In some embodiments, the print head 216 may discharge an adhesive-coated cementitious material, forming an adhesive-coated cementitious extrudate 222. Alternatively, or in addition, the one or more adhesive formulation nozzles 240 may be configured to apply an adhesive formulation 242 onto the build surface 232. The adhesive formulation pump 236 may operate according to machine-executable instructions from the print controller 202 so as to feed the adhesive formulation to the one or more printing tools 206, and the one or more printing tools 206 may operate according to machine-executable instructions from the print controller 202 so as to move according to respective toolpaths. The adhesive formulation 242 may be applied during movement along all or a portion of the toolpaths. The adhesive formulation pump 236 and the one or more printing tools 206 may work in concert according to machine-executable instructions from the print controller 202 to apply adhesive before, during, or after printing sequential contours that make up a cementitious structure 100.

Now turning to FIGS. 2B-2E, exemplary print heads 216 will be described in further detail. As shown in FIGS. 2B-2E, a print head 216 may include one or more cementitious material nozzles 220 and one or more adhesive formulation nozzles 240. The adhesive formulation nozzles 240 may be configured to discharge an adhesive formulation 242 before, during, or after the one or more cementitious material nozzles 220 extrude cementitious material. The one or more adhesive formulation nozzles 240 maybe integrally formed as part of the print head 216. Alternatively, the one or more adhesive formulation nozzles 240 may be provides as part of a separate component, coupled to or separated from the print head 216.

Figure 2B:
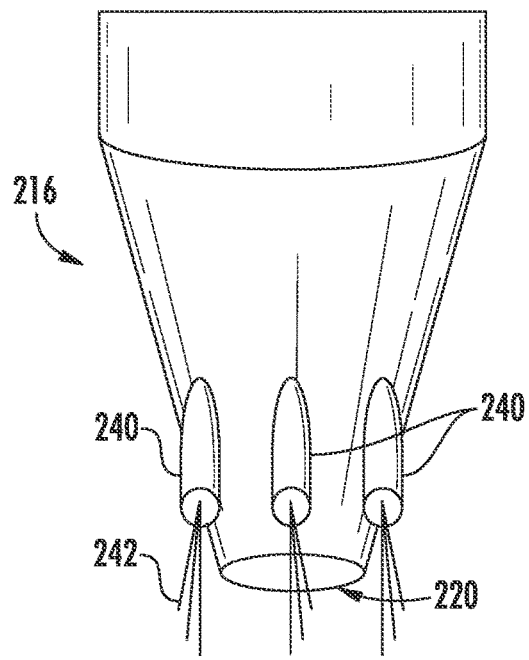
FIGS. 2B-2E schematically illustrate exemplary print heads of an additive printing device.

As shown in FIG. 2B, one or more adhesive formulation nozzles 240 may circumferentially surround a cementitious material nozzle 220. The circumferentially surrounding adhesive formulation nozzles 240 may spray adhesive formulation 242 on the cementitious material as it extrudes from the cementitious material nozzle 220, providing an adhesive-coated cementitious extrudate 222. Alternatively, or in addition, the adhesive formulation nozzles 240 may spray adhesive formulation 242 on the build surface, such as in advance of the cementitious material being applied to the build surface.

Figure 2C:
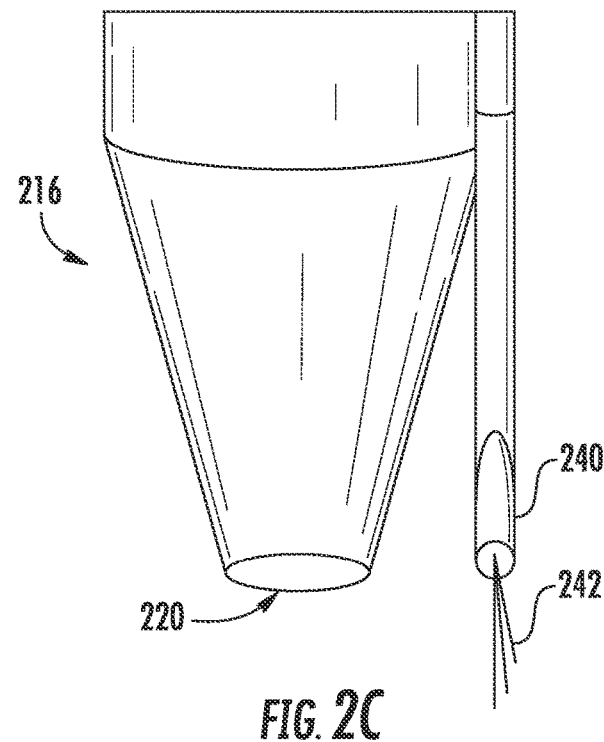

As shown in FIG. 2C, an adhesive formulation nozzle 240 may be provided as a separate component. The adhesive formulation nozzle 240 may be coupled to the print head 216 or separated from the print head 216. The adhesive formulation nozzle 240 shown in FIG. 2C may similarly spray adhesive formulation 242 on the build surface, such as in advance of the cementitious material being applied to the build surface.

Figure 2D:
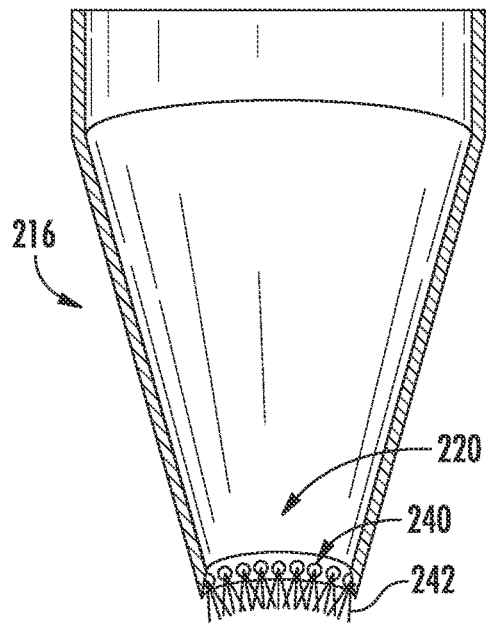

As shown in FIG. 2D, one or more adhesive formulation nozzles 240 may be located at an interior surface of a cementitious material nozzle 220. Such adhesive formulation nozzles 240 may be configured to discharge adhesive formulation as cementitious material is extruded from the cementitious material nozzle 220, so as to coat the cementitious material with a layer of adhesive formulation 242 as extruded from the cementitious material nozzle 220.

Figure 2E:
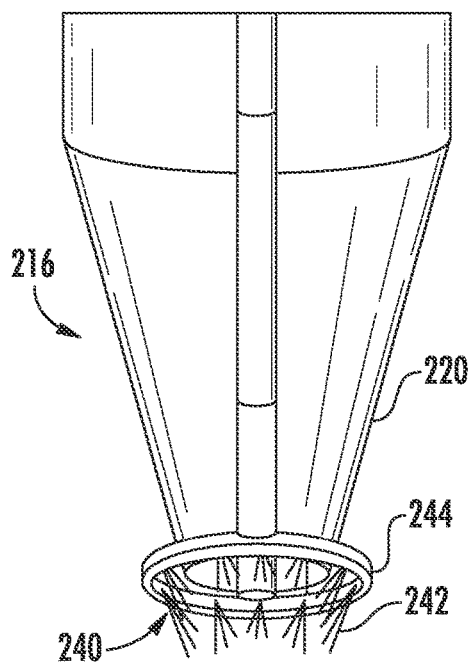

As shown in FIG. 2E, one or more adhesive formulation nozzles 240 may be positioned on a manifold 244 that circumferentially surrounds the cementitious material nozzle 220. Such adhesive formulation nozzles 240 may be configured to discharge adhesive formulation as cementitious material is extruded from the cementitious material nozzle 220, so as to coat the cementitious material with a layer of adhesive formulation 242 as extruded from the cementitious material nozzle 220.

One approach for printing a cementitious structure 100 includes extruding one or more contours so as to build a continuous spiraling layer or series of layers. The contours may be formed by toolpaths that may move back-and-forth or side-to-side in any which way, but that generally cause the cementitious structure to grow in a spiral manner. This approach lends itself to hollow cementitious structures 100 such as towers for wind turbines 102 and the like. The spiraling layer or layers may have a relatively shallow slope, such that a distance corresponding to the circumference or perimeter of the cementitious structure 100 provides an increase in height corresponding to a thickness of the layer or layers. Another approach for printing a cementitious structure includes extruding one or more contours so as to build horizontal overlapping layers. Other approaches are also contemplated, all of which are within the spirit and scope of the present disclosure.

Figure 3A:
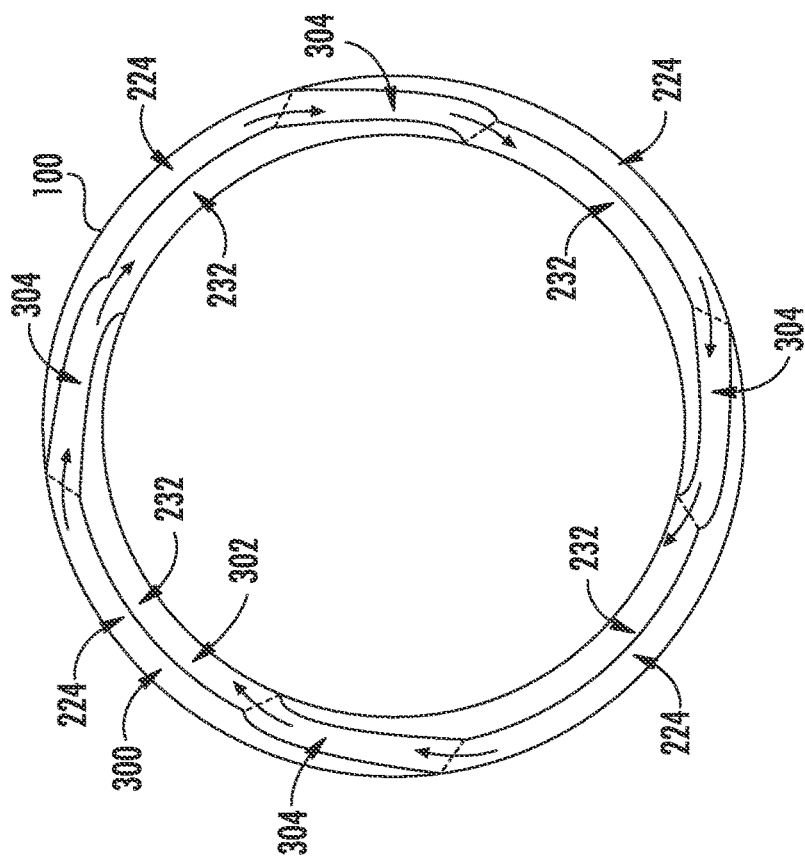
FIGS. 3A and 3B schematically illustrate top views of exemplary build surfaces during additively printing a cementitious structure.
Figure 3B:
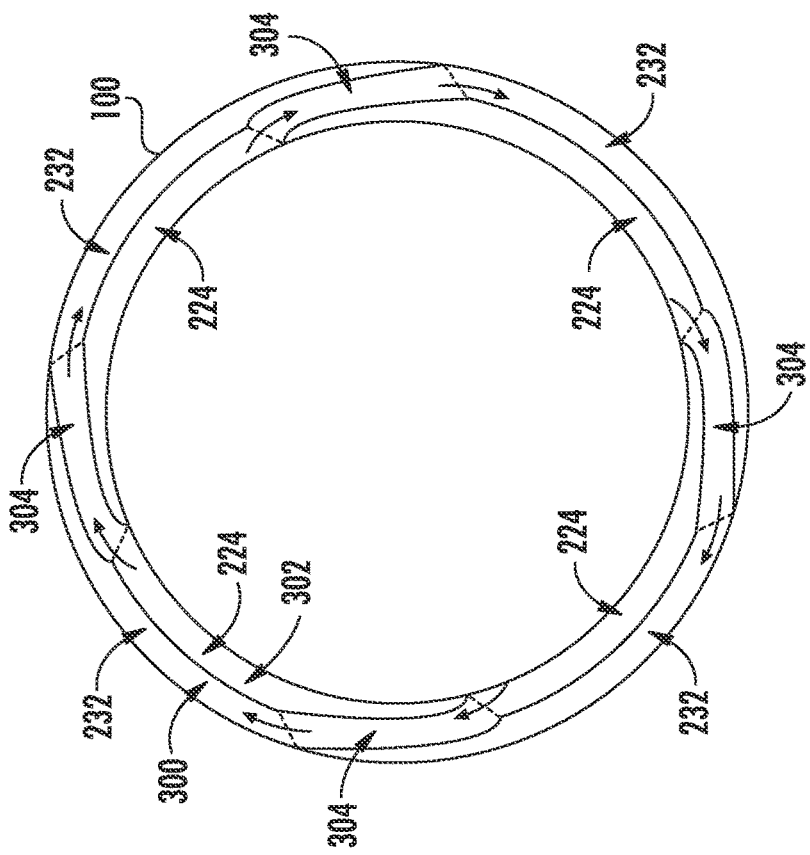

In some embodiments, as shown for example in FIGS. 3A and 3B, the build surface 232 and the one or more ledges may alternate positions with one another. For example, as shown in FIG. 3A, a build surface 232 includes a first region 300 of a cementitious structure 100 and one or more ledges 224 include a second region 302 of a cementitious structure 100. In some embodiments, the first region 300 may include an outer perimeter region of the cementitious structure 100 and the second region 302 may include an inner perimeter region of the cementitious structure 100. An additive printing device 200 may print or more contours on the build surface 232 including the first region 300 while the support members 208 are located within the second region 302. When the first region 300 has sufficiently cured, the support members 208 of the additive printing device 200 may move the support members 208 from the second region 302 to the first region 300, for example, following a path indicated by arrows. In some embodiments, one or more ramps 304 may be provided to assist the support members 208 in moving from the second region 302 to the first region 300, and vice versa. The ramps 304 may form part of the contours printed on the build surface 232. Alternatively, the ramps 304 may be a component that is positioned or repositioned on the cementitious structure at appropriate locations.

As the support members 208 move from the second region 302 to the first region 300, as shown in FIG. 3B, the build surface 232 and the one or more ledges 224 alternate positions with one another relative to their positions as shown in FIG. 3A. With the support members 208 now located in the first region 300 of the cementitious structure, the printing tool(s) 206 may print one or more contours on the build surface 232 now located in the second region 302. The build surface 232 and the ledges 224 may continue to alternate between the first region 300 and the second region 302, with the support members 208 following the alternating location of the ledges 224 and the printing tool(s) 206 continuing to print contours on the build surface 232. In some embodiments, the additive printing device 200 may print a continuous spiraling contour that alternates from the first region 300 to the second region 302 and back to the first region 300, while the support members correspondingly alternate from the second region 302 to the first region 300 and back to the second region 302.

It will be appreciated that the direction of the movement of the support members 208 as indicated by arrows may be reversed or alternated, for example, depending on the direction of printing. For example, as shown, the first region 300 and the second region 302 may be printed in the same direction, such as clockwise or counter-clockwise. Alternatively, the first region 300 and the second region 302 may be printed in opposite directions relative to one another. For example, the first region 300 may be printed clockwise and the second region 302 may be printed counter-clockwise, or vice versa. Likewise, the support members 208 may alternate between moving clockwise and counter-clockwise, such as to coincide with the direction of printing. Additionally, the orientation of the ramps 304 may be modified so as to accommodate the direction and/or alternating direction of the printing, and/or the direction and/or alternating direction of the movement of the support members 208.

Figure 4A:
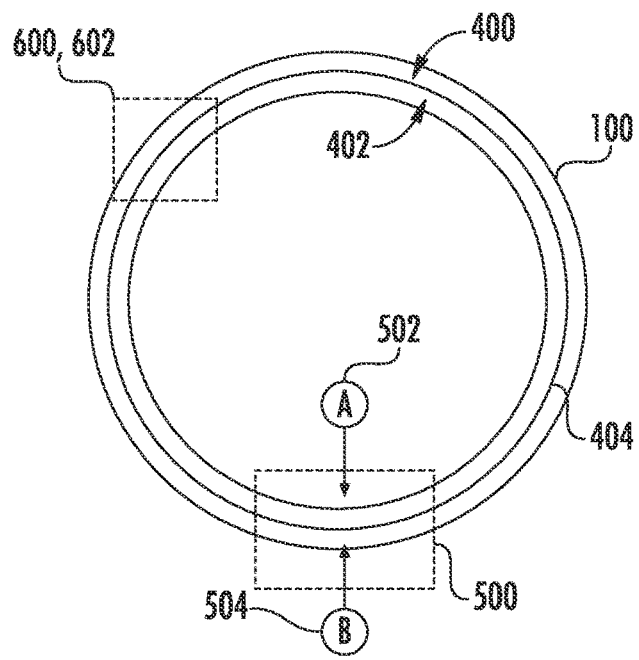
FIGS. 4A and 4B schematically illustrate a top view and a perspective view, respectively, of an exemplary additively printed cementitious structure.
Figure 4B:
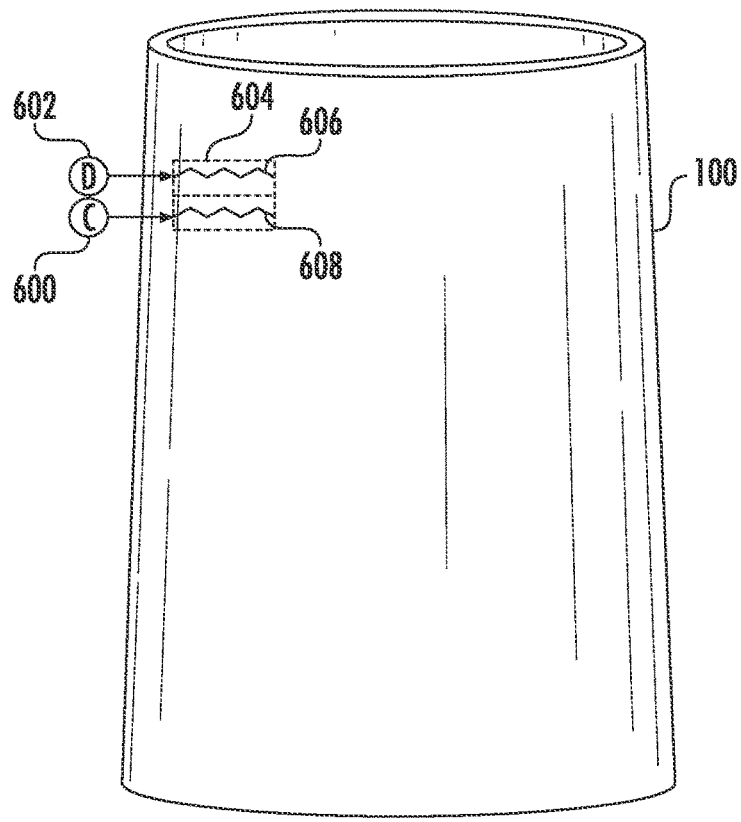

Now turning to FIG. 4A through FIG. 13H, exemplary contours will be described in further detail. FIG. 4A schematically illustrates a top view of an exemplary additively printed cementitious structure 100. Exemplary contours include contour coupling features as described herein. Such contour coupling features may include any combination of shapes or surfaces so as to provide mechanically-coupling interfaces between adjacent contours. These mechanically-coupling interfaces may supplement interlayer bonding through crystallization of hydration products in the cementitious material. Exemplary contour coupling features that engage with one another include nesting, mating, overlapping, and/or interlocking or otherwise engaging features of a contour. Such contour coupling features of a contour may nest, mate, overlap, and/or interlock or otherwise engage with corresponding contour coupling features of one or more adjacent contours. FIG. 4B schematically illustrates a perspective view of an exemplary additively printed cementitious structure 100.

Figure 5A:
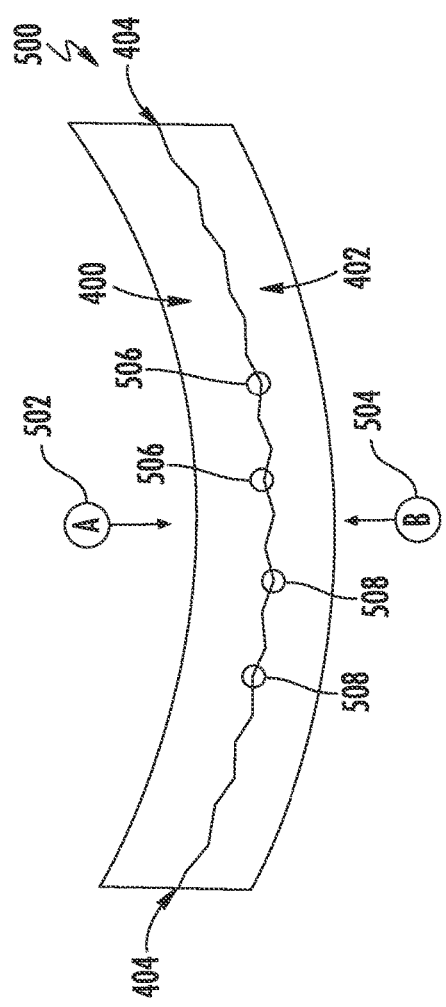
FIG. 5A schematically illustrates an enlarged partial top view of the exemplary additively printed cementitious structure of FIGS. 4A and 4B.
Figure 5C:
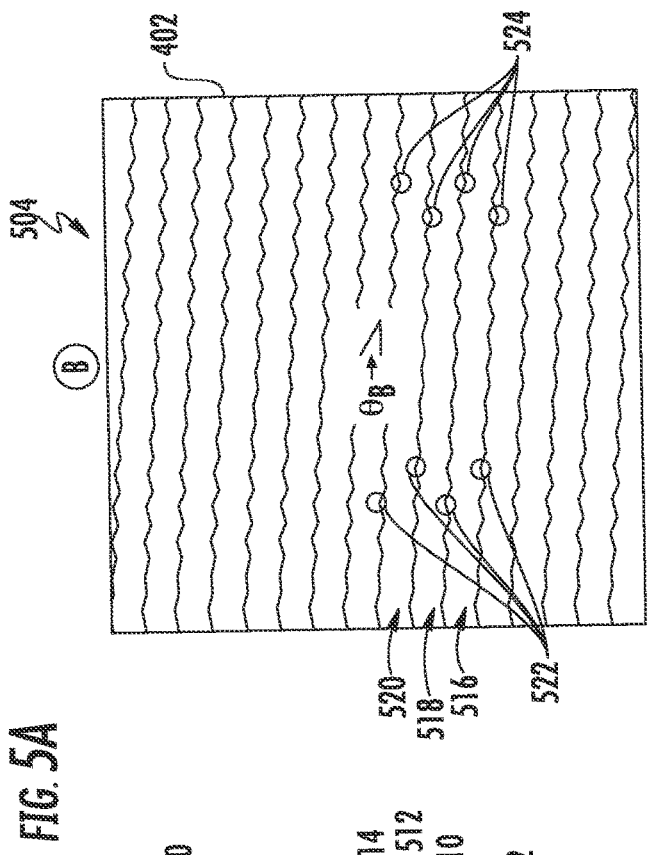
FIGS. 5B and 5C schematically illustrate enlarged perspective views of the exemplary additively printed cementitious structure of FIG. 4A.
Figure 5B:
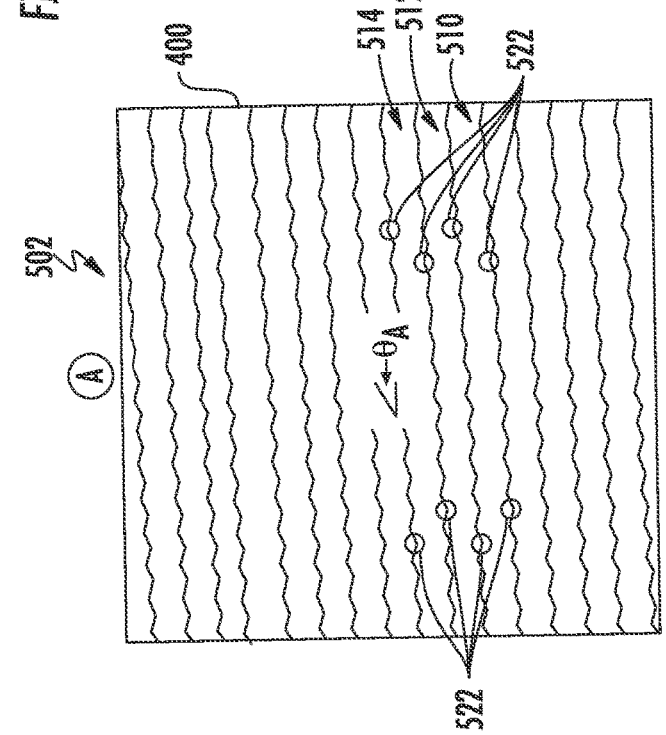

As shown in FIG. 4A, an additively printed cementitious structure 100 may include one or more adjacent segments, such as a first segment 400 and a second segment 402, which may be adjacent to and abutting one another at a lateral contour interface 404. The first segment 400 may include an outer perimeter region 400 of the cementitious structure 100 and the second segment 402 may include an inner perimeter region of the cementitious structure 100. For example, the first segment 400 and the second segment 402 may be concentric segments, such as an outer concentric segment and an inner concentric segment. FIG. 5A shows an enlarged partial top view 500 of the cementitious structure 100 of FIG. 4A. Correspondingly, FIG. 5B shows an enlarged perspective view 502 taken from perspective "A" of the cementitious structure 100 corresponding to the enlarged partial top view 500, and FIG. 5C shows an enlarged perspective view 504 taken from perspective "B" of the cementitious structure 100 corresponding to the enlarged partial top view 500.

As shown in the enlarged partial top view 500, one or more contours of the first segment 400 may include contour coupling features 506 that engage with corresponding contour coupling features of one or more adjacent contours of the second segment 402. Likewise, one or more contours of the second segment 402 may include contour coupling features 508 that engage with corresponding contour coupling features of one or more adjacent contours of the first segment 400. The contour coupling features 506, 508 shown in the enlarged view 500 may include lateral contour coupling features configured to engage with corresponding contour coupling features of one or more contours located laterally adjacent to the respective contour. Additionally, the contour coupling features 506, 508 shown in the enlarged view 500 may include contour coupling features configured to engage with corresponding contour coupling features of one or more adjacent contours at any other location or combination of locations, such as contours located laterally above and/or laterally below the respective contour.

As shown in the enlarged perspective views 502, 504 taken from perspectives "A" and "B", a cementitious structure 100 includes one or more contours layered on top of one another. For example, the first segment 400 may include a first contour 510, a second contour 512 layered on top of the first contour 510, and a third contour 514 layered on top of the second contour 512, and so on. In some embodiments, the first contour 510 may be a first layer or a portion of a first layer of a cementitious structure, the second contour 512 may be a second layer or a portion of a second layer of the cementitious structure, and/or the third contour 514 may be a third layer or a portion of a third layer of the cementitious structure. Likewise, the second segment 402 may include a fourth contour 516, a fifth contour 518 layered on top of the fourth contour 516, and a sixth contour 520 layered on top of the fifth contour 518, and so on. In some embodiments, the fourth contour 516 may be a first layer or a portion of a first layer of a cementitious structure, the fifth contour 518 may be a second layer or a portion of a second layer of the cementitious structure, and/or the sixth contour 520 may be a third layer or a portion of a third layer of the cementitious structure. The contours may have a slope, which may differ as between the first segment 400 and the second segment 402. For example, one or more contours of the first segment 400 may have a first slope $\theta_A$, and one or more contours may have a second slope $\theta_B$ that differs from the first slope $\theta_A$. In an exemplary embodiment, the first slope $\theta_A$ may be a positive slope and the second slope $\theta_B$ may be a negative slope. The first slope $\theta_A$ and the second slope $\theta_B$ may have common, inverse rates of change relative to one another, or the first slope $\theta_A$ and the second slope $\theta_B$ may have differing, inverse rates of change. Such slopes $\theta_A$, $\theta_B$ may be measured relative to a normal line, such as a line corresponding to a level elevation or other suitable normal line. The first slope $\theta_A$ and/or the second slope $\theta_B$ may be any desired slope, such as a slope from −45 degrees to 45 degrees. The first slope $\theta_A$ may be from −45 degrees to 45 degrees, such as from −45 to 0 degrees, such as from 0 degrees to 45 degrees, such as from −45 to −30 degrees, such as from −30 to −20 degrees, such as from −20 to −10 degrees, such as from −10 to 0 degrees, such as from −5 to 0 degrees, such as from 0 to 5 degrees, such as from 5 to 10 degrees, such as from 10 to 20 degrees, such as from 20 to 30 degrees, such as from 30 to 45 degrees. The second slope $\theta_B$ may be from −45 degrees to 45 degrees, such as from −45 to 0 degrees, such as from 0 degrees to 45 degrees, such as from −45 to −30 degrees, such as from −30 to −20 degrees, such as from −20 to −10 degrees, such as from −10 to 0 degrees, such as from −5 to 0 degrees, such as from 0 to 5 degrees, such as from 5 to 10 degrees, such as from 10 to 20 degrees, such as from 20 to 30 degrees, such as from 30 to 45 degrees.

The differing slopes $\theta_A$, $\theta_B$ as between the first segment 400 and the second segment 402 allow for respective contours to intersect one another at or along the lateral contour interface 404. For example, the first contour 510 of the first segment 400 may intersect the fourth contour 516 of the second segment 402. Likewise, the second contour 512 may intersect the fifth contour 518, and the third contour 514 may intersect the sixth contour 520, and so on. Additionally, respective contours may intersect multiple other contours at or along the lateral contour interface 404. Such intersecting contours at or along the lateral contour interface 404 allow for contour coupling features of the respective contours to engage across the lateral contour interface 404 with corresponding contour coupling features of one or more adjacent contours, such as laterally adjacent contours. These intersecting contours may be seen by translating the perspective view 502 taken from perspective "A" onto the perspective view 504 taken from perspective "B".

As further shown in these perspective views 502, 504, one or more contours of the first segment 400 (e.g., the first contour 510, the second contour 512, and/or the third contour 514) may include contour coupling features 522 that engage with corresponding contour coupling features of one or more adjacent contours of the first segment 400. The contour coupling features 522 may include vertical contour coupling features that engage with an adjacent contour located above and/or an adjacent contour located below the contour. For example, the second contour 512 may include vertical contour coupling features 522 that engage with corresponding contour coupling features of the first contour 510 and/or with corresponding contour coupling features of the third contour 514. Likewise, one or more contours of the second segment 402 (e.g., the fourth contour 516, the fifth contour 518, and/or the sixth contour 520) may include vertical contour coupling features 524 that engage with corresponding contour coupling features of one or more adjacent contours located above and/or below the contour. In addition to the vertical contour coupling features, the contours shown in the perspective views 502, 504 may include contour coupling features configured to engage with corresponding contour coupling features of one or more adjacent contours at any other location or combination of locations, such as adjacent contours located laterally relative to the respective contour.

Figure 6A:
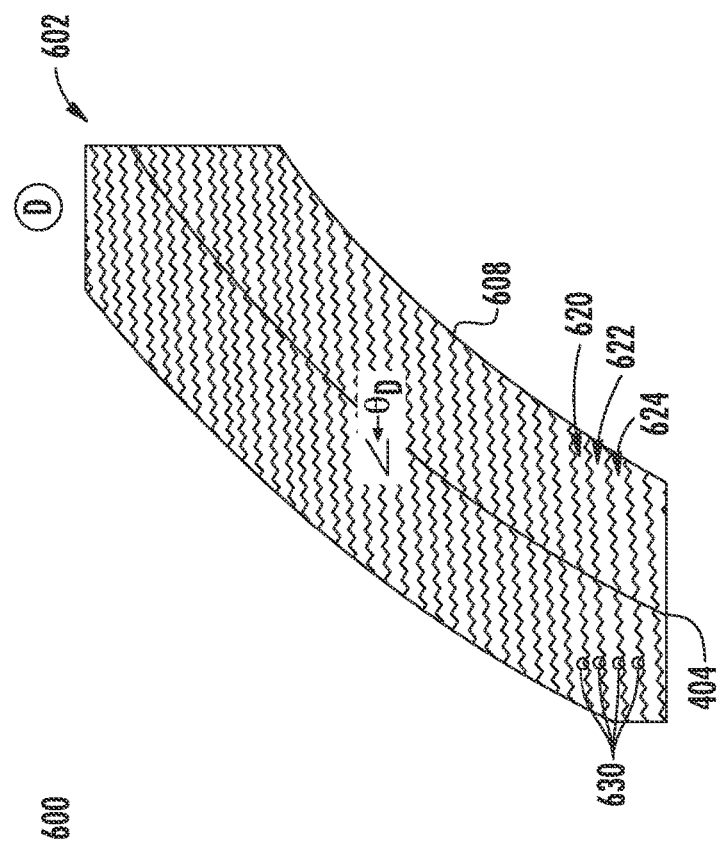
FIGS. 6A and 6B schematically illustrate enlarged top views of the exemplary additively printed cementitious structure of FIGS. 4A and 4B.
Figure 6B:
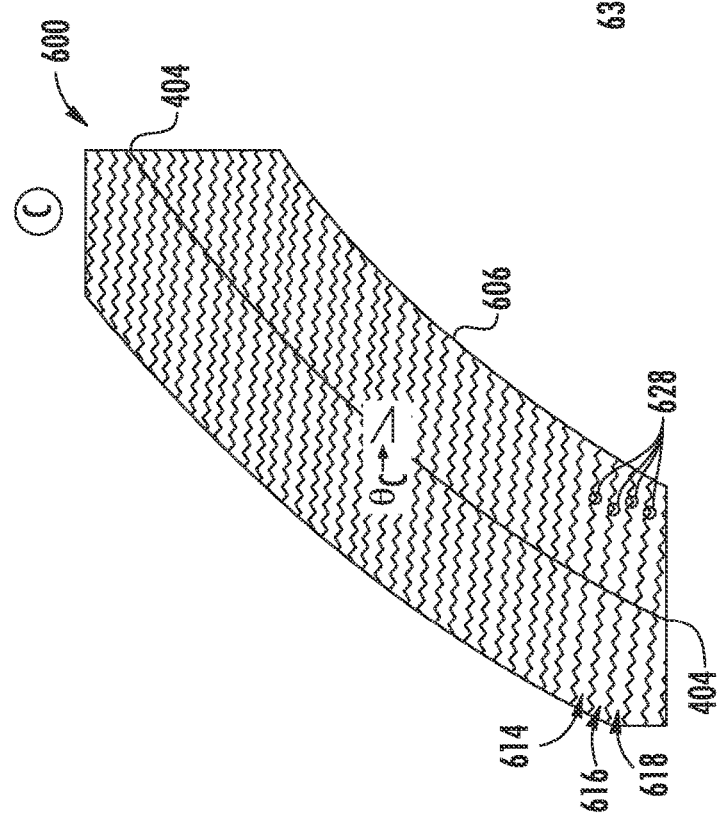
Figure 6C:
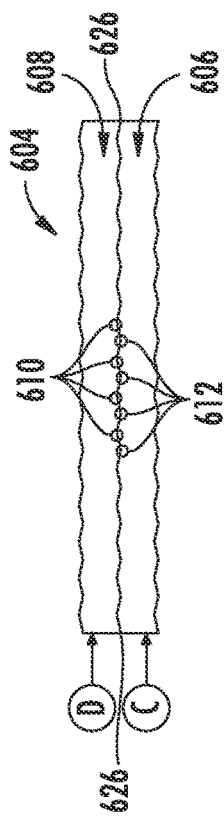
FIG. 6C schematically illustrates an enlarged perspective view of the exemplary additively printed cementitious structure of FIGS. 4A and 4B.

Referring now to FIGS. 6A-6C, additional enlarged partial top views of the cementitious structure 100 of FIGS. 4A and 4B are shown in FIGS. 6A and 6B, and a corresponding enlarged partial perspective view is shown in FIG. 6C. FIG. 6A shows an enlarged partial top view 600 of the cementitious structure 100 of FIG. 4A taken from a first elevation "C" shown in the corresponding perspective view of FIG. 4B. FIG. 6B shows an enlarged partial top view 602 taken a second elevation "D" shown in the corresponding partial perspective view of FIG. 4B. FIG. 6C shows an enlarged partial perspective view 604 corresponding to the top views 600, 602 shown in FIGS. 6A and 6B. In some embodiments the first elevation "C" and the second elevation "D" may include contours adjacent to one another. For example, as shown in FIG. 6C, a cementitious structure 100 may include a seventh contour 606 at elevation "C" adjacent to an eighth contour 608 at elevation "D". The seventh contour 606 may be located adjacently above the sixth contour 606, and/or the sixth contour 606 may be located adjacently below the seventh contour 608.

As shown in the enlarged partial perspective view 604, one or more contours at elevation "C" may include contour coupling features 610 that engage with corresponding contour coupling features of one or more adjacent contours at elevation "D". Likewise, one or more contours at elevation "D" may include contour coupling features 612 that engage with corresponding contour coupling features of one or more adjacent contours at elevation "C". The contour coupling features 610, 612 shown in the enlarged partial perspective view 604 may include vertical contour coupling features configured to engage with corresponding contour coupling features of one or more contours located adjacently above and/or adjacently below the respective contour. Additionally, the contour coupling features 610, 612 shown in the enlarged partial perspective view 604 may include contour coupling features configured to engage with corresponding contour coupling features of one or more adjacent contours at any other location or combination of locations, such as contours located laterally adjacent to the respective contour.

Referring again to the enlarged partial top views 600, 602 at elevations "C" and "D" shown in FIGS. 6A and 6B, a cementitious structure 100 includes one or more contours located laterally adjacent to one another. For example, as shown in FIG. 6A, a cementitious structure 100 may include at elevation "C" an eighth contour 614, a ninth contour 616 laterally adjacent to the eighth contour 614, and a tenth contour 618 laterally adjacent to the ninth contour 616, and so on. Likewise, as shown in FIG. 6B, a cementitious structure 100 may include at elevation "D" an eleventh contour 620, a twelfth contour 622 laterally adjacent to the eleventh contour 620, and a thirteenth contour 624 laterally adjacent to the twelfth contour 622, and so on.

The contours may have an angle, which may differ as between elevation "C" and elevation "D". For example, one or more contours at elevation "C" may have a first angle $\theta_C$, and one or more contours at elevation "D" may have a second angle $\theta_D$ that differs from the first angle $\theta_C$. In an exemplary embodiment, the first angle $\theta_C$ may be a positive angle and the second angle $\theta_D$ may be a negative angle. The first angle $\theta_C$ and the second angle $\theta_D$ may have common, inverse rates of change relative to one another, or the first angle $\theta_C$ and the second angle $\theta_D$ may have differing, inverse rates of change. Such angles $\theta_C$, $\theta_D$ may be measured relative to a normal line, such as a radial line or other suitable normal line. The first angle $\theta_C$ and/or the second angle $\theta_D$ may be any desired angle, such as an angle from −45 degrees to 45 degrees relative to a radial line or other suitable normal line. The first angle $\theta_C$ may be from −45 degrees to 45 degrees, such as from −45 to 0 degrees, such as from 0 degrees to 45 degrees, such as from −45 to −30 degrees, such as from −30 to −20 degrees, such as from −20 to −10 degrees, such as from −10 to 0 degrees, such as from −5 to 0 degrees, such as from 0 to 5 degrees, such as from 5 to 10 degrees, such as from 10 to 20 degrees, such as from 20 to 30 degrees, such as from 30 to 45 degrees. The second angle $\theta_D$ may be from −45 degrees to 45 degrees, such as from −45 to 0 degrees, such as from 0 degrees to 45 degrees, such as from −45 to −30 degrees, such as from −30 to −20 degrees, such as from −20 to −10 degrees, such as from −10 to 0 degrees, such as from −5 to 0 degrees, such as from 0 to 5 degrees, such as from 5 to 10 degrees, such as from 10 to 20 degrees, such as from 20 to 30 degrees, such as from 30 to 45 degrees.

The differing angle $\theta_C$, $\theta_D$ as between elevation "C" and elevation "D" allow for respective contours to intersect one another at or along a vertical contour interface 626. For example, the eighth contour 614 at elevation "C" may intersect the eleventh contour 620 at elevation "D". Likewise, the ninth contour 616 may intersect the twelfth contour 622, and the tenth contour 618 may intersect the thirteenth contour 624, and so on. Additionally, respective contours may intersect multiple other contours at or along the vertical contour interface 626. Such intersecting contours at or along the vertical contour interface 626 allow for contour coupling features of the respective contours to engage across the vertical contour interface 626 with corresponding contour coupling features of one or more adjacent contours, such as contours adjacently above and/or adjacently below the respective contour. These intersecting contours may be seen by translating the partial top view 600 at elevation "C" onto the partial top view 602 at elevation "D".

As further shown in these partial top views 600, 602, one or more contours at elevation "C" (e.g., the eighth contour 614, the ninth contour 616, and/or the tenth contour 618) may include contour coupling features 628 that engage with corresponding contour coupling features of one or more adjacent contours at elevation "C". The contour coupling features 628 may include lateral contour coupling features that engage with one or more laterally adjacent contours. For example, the ninth contour 616 may include lateral contour coupling features 628 that engage with corresponding contour coupling features of the eighth contour 614 and/or with corresponding contour coupling features of the tenth contour 618. Likewise, one or more contours at elevation "D" (e.g., the eleventh contour 620, the twelfth contour 622, and/or the thirteenth contour 624) may include lateral contour coupling features 630 that engage with corresponding contour coupling features of one or more laterally adjacent contours. In addition to the lateral contour coupling features, the contours shown in the enlarged top views 600, 602 may include contour coupling features configured to engage with corresponding contour coupling features of one or more adjacent contours at any other location or combination of locations, such as adjacent contours located laterally above and/or laterally below the respective contour (e.g., the contour coupling features 610, 612 shown in FIG. 6C).

Now turning to FIGS. 7A-7G, exemplary contour coupling features will be described. FIGS. 7A-7G show exemplary cross-sectional views of contours with contour-coupling features. It will be appreciated that the cross-sectional views shown in FIGS. 7A-7G may be seen as taken from any perspective, including a top view, a side view, and an end view. For example, FIG. 8A shows the exemplary cross-sectional view of FIG. 7C taken as a top view of a cementitious structure 100. Thus, the views shown in FIGS. 7A-7G may reflect a top cross-sectional view of the cementitious structure 100, such that the contour coupling features may include lateral contour coupling features. Alternatively, FIG. 8B shows the exemplary cross-sectional view of FIG. 7C taken as a side cross-sectional view of a cementitious structure 100. Thus, the views shown in FIGS. 7A-7G may reflect side cross-sectional view, such that the contour coupling features may include vertical contour coupling features. Further, the views shown in FIGS. 7A-7G may reflect cross-sectional views taken at any desired angle.

Figure 7A:
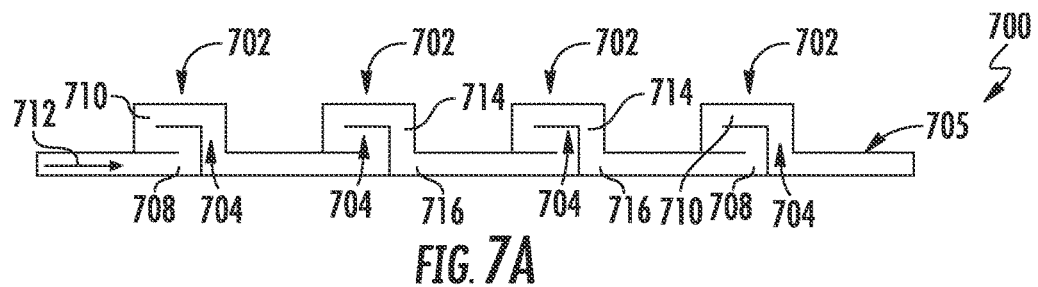
FIGS. 7A-7J schematically illustrate exemplary cross-sectional views of contours with contour-coupling features.
Figure 8A:
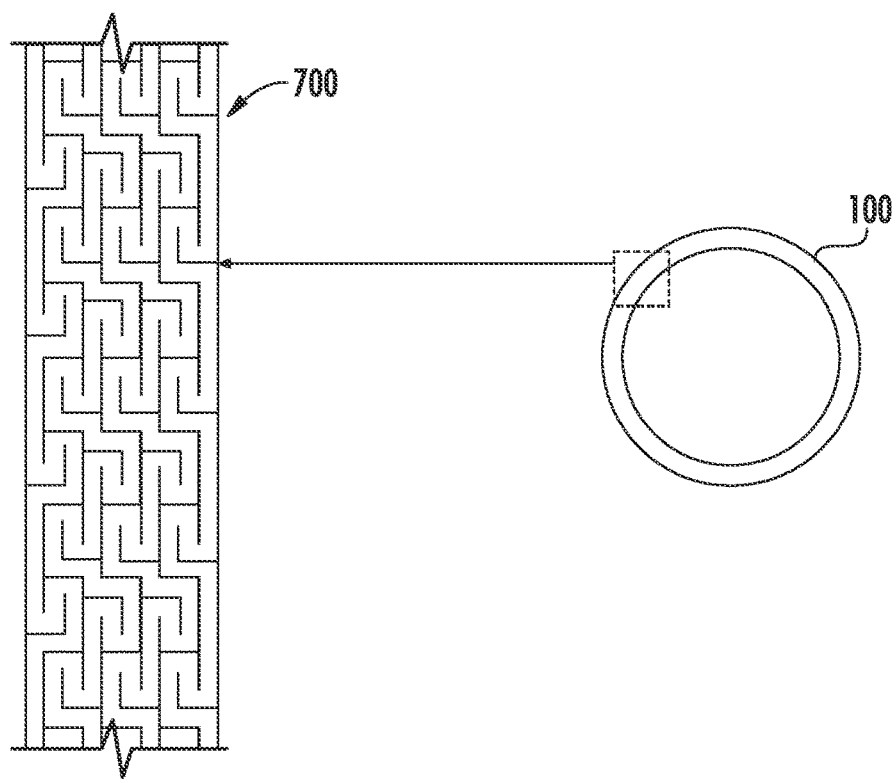
FIGS. 8A and 8B schematically illustrate an enlarged top view and an enlarged perspective view, respectively, of one or more exemplary contours of an additively printed cementitious structure that include contour-coupling features.
Figure 8B:
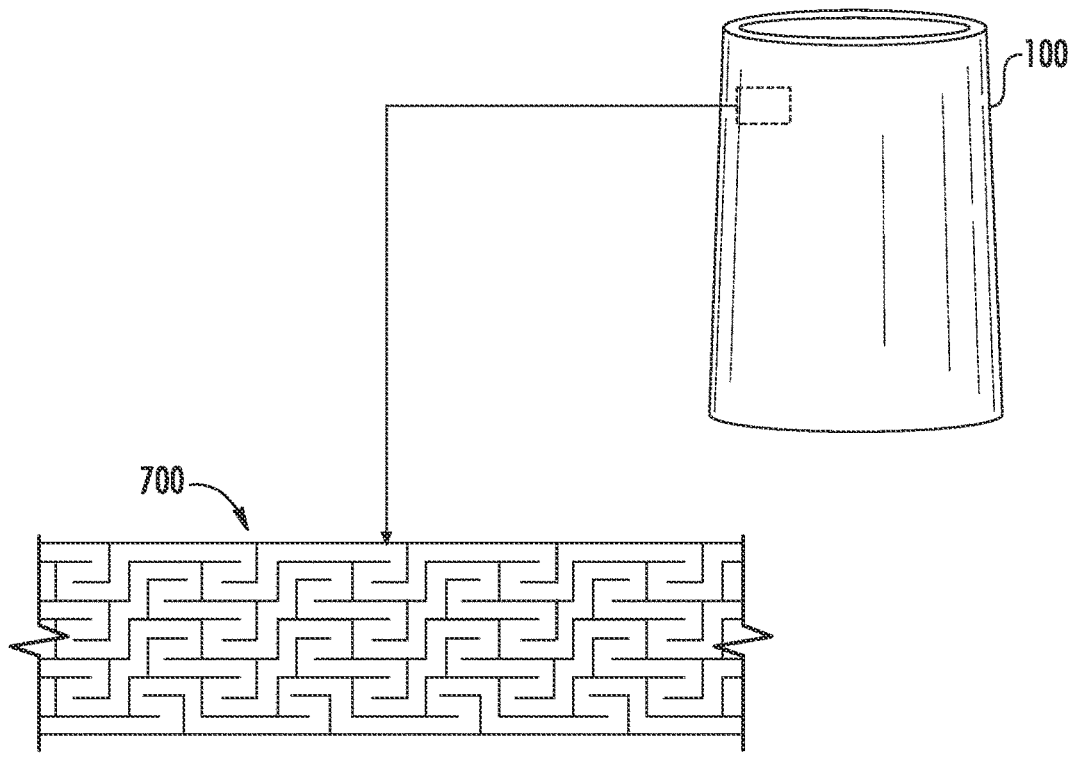

As shown in FIG. 7A, an exemplary contour 700 includes one or more contour coupling features 702. In some embodiments, the contour coupling features 702 include a portion of the contour 700 that follows a serpentine path 704, such as a winding, non-linear path, which may include, for example, curves, corners, twists, turns, bends, loops, zig-zags, directional shifts, elevation shifts, double-backs, oscillations, undulations, and so forth. As shown in FIG. 7A, the contour 700 may optionally include an adhesive formulation 705 applied to at least a portion thereof.

In some embodiments, a contour coupling feature 702 may include a portion of a contour 700 that has at least one switchback 708, 710 and/or at least one elbow 714, 716 in the path of the contour. A serpentine path 704 may include one or more switchbacks and/or one or more elbows. For example, the contour coupling features 702 in the contour 700 shown in FIG. 7A includes a serpentine path 704 that has one or more switchbacks 708, 710. With the contour extruded along a trajectory from left to right indicated by arrow 712, a first switchback 708 reverses the direction of the contour 700, and a second switchback 710 again reverses the direction of the contour 700. As a further example, the contour coupling features 702 in the contour 700 shown in FIG. 7A includes a serpentine path 704 that has one or more elbows 714, 716.

With the contour 700 extruded from left to right as indicated by the arrow 712, after the switchbacks 708, 710, the contour includes a first elbow 714 and a second elbow 716. As shown, the first elbow 714 and the second elbow 716 may turn in opposite direction, such that the contour 700 may resume with a previous trajectory after the contour coupling feature 702. In some embodiments, a contour coupling feature 702 may include at least one switchback 708, 710 and at least one elbow 714, 716. For example, as shown in FIG. 7A, a contour coupling feature 702 includes one or more switchbacks (e.g., a first switchback 708 and a second switchback 710) and one or more elbows (e.g., a first elbow 714 and a second elbow 716). While the contour coupling features 702 shown in FIG. 7A include two switchbacks and two elbows, it will be appreciated that contour coupling features may include any number of switchbacks and/or elbows.

Figure 7B:
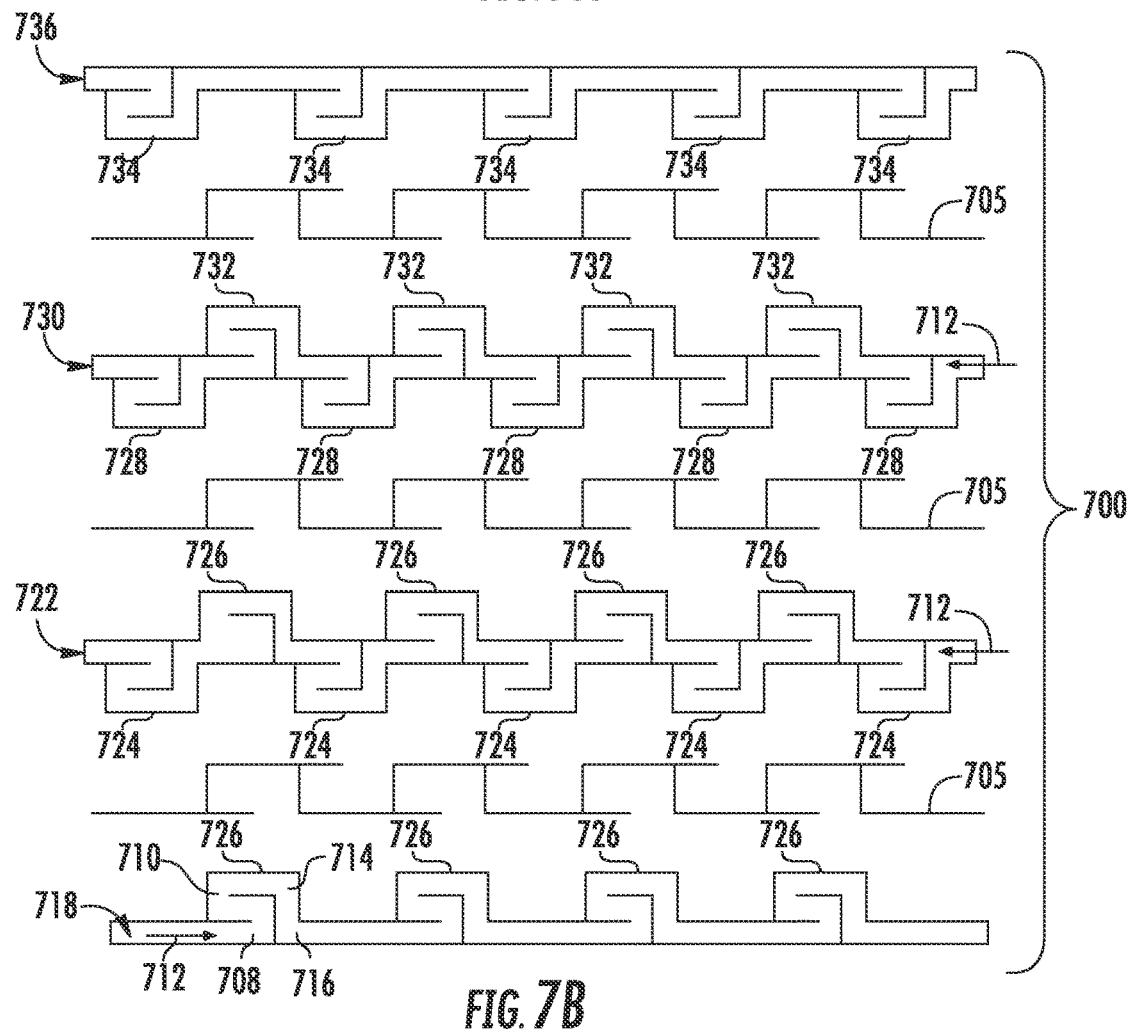
Figure 7C:
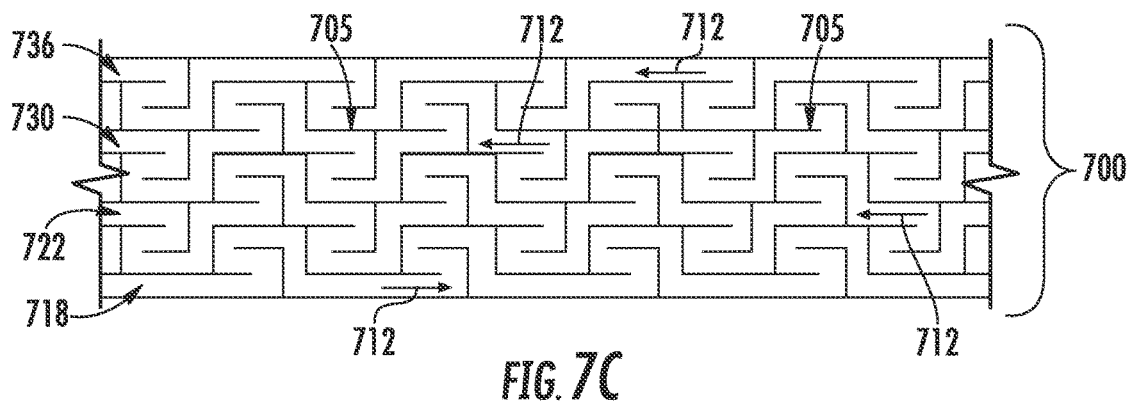

Regardless of the particular serpentine path 704, a contour coupling feature 702 may include nesting, mating, overlapping, and/or interlocking or otherwise engaging features. Such contour coupling features 702 may engage with corresponding contour coupling features 702 of one or more adjacent contours 700. For example, FIG. 7B shows an exploded view of one or more contours with contour coupling features and FIG. 7C shows the plurality of contours with contour coupling features engaging with one another. It will be appreciated that the plurality of contours shown in FIGS. 7B and 7C may reflect either one or more separate contours, or one or more portions of the same contour, such as a continuous contour. For example, sequential contours may be applied adjacent to one another, such as next to one another or on top of one another. The contour coupling features may allow the sequential contours to engage with one another. Additionally, or in the alternative, a contour may include various portions that run adjacent to one another, and the contour coupling features may allow adjacent portions of the contour to engage with one another.

As shown in FIG. 7B, a first contour 718 or first portion of a contour 700 may include a first plurality of contour coupling features 720, and a second contour 722 or second portion of a contour 700 may include a second plurality of contour coupling features 724. The first plurality of contour coupling features 720 of the first contour 718 or first portion of a contour 700 may engage with the second plurality of contour coupling features 724 of the second contour 722 or second portion of a contour 700. In some embodiments, a contour may include contour coupling features that engage with one or more adjacent contours or adjacent portions of the contour 700. For example, as shown in FIG. 7B, the second contour 722 second portion of a contour 700 may include a second plurality of contour coupling features 724 and a third plurality of contour coupling features 726. The second plurality of contour coupling features 724 may engage with a corresponding first plurality of contour coupling features 720 of the first contour 718 or first portion of a contour 700, and the third plurality of contour coupling features 726 may engage with a corresponding fourth plurality of contour coupling features 728 of a third contour 730 or third portion of a contour 700. Likewise, the third contour 730 or third portion of a contour 700 may include a fourth plurality of contour coupling features 728 and a fifth plurality of contour coupling features 732. The fourth plurality of contour coupling features 728 may engage with a corresponding third plurality of contour coupling features 726 of the second contour 722 or second portion of a contour 700, and the fifth plurality of contour coupling features 732 may engage with a corresponding sixth plurality of contour coupling features 734 of a fourth contour 736 or fourth portion of a contour 700. An adhesive formulation 705 may optionally be applied to at least a portion one any one or more contours.

When printing a cementitious material, various contours or portions of a contour 700 may be printed such that respective contours or portions thereof are adjacent to one another, such as laterally adjacent, adjacently above, and/or adjacently below respective contours or portions thereof. Contour coupling features may be formed in a contour by orienting one or more printing tools 206 with respect to a toolpath such that cementitious material extruded from the one or more cementitious material nozzles 220 of the printing tool forms the desired contour and contour coupling features. When forming a contour that includes vertical contour coupling features (e.g., contour coupling features extending upward and/or downward relative to a nominal elevation of the contour), it may be desirable for the one or more printing tools 206 to follow a toolpath that allows the currently-extruding portion of the cementitious material to remain on top of already extruded portions of cementitious material. For example, when FIGS. 7A-7C are taken as a side cross-sectional view, the arrow 712 shows a printing direction for the contours that allows currently-extruding cementitious material to remain on top of already extruded portions. The first switchback 708 places the cementitious material on top of cementitious material forming the previously printed portion of the contour 700, and the second switchback 710 places cementitious material on top of the cementitious material forming the first switchback 708, while the first and second elbows 714, 716 return the extrudate to the prior trajectory of the contour 718.

On the other hand, if printing in the opposite direction of the arrow 712, cementitious material forming the first switchback 708 would be located beneath the cementitious material forming the second switchback 710 even though extruded after the cementitious material forming the second switchback 710. Vertical contour coupling features with later-extruded cementitious material located beneath earlier-extruded cementitious material may be formed, for example, by extruding a more upright feature and allowing or causing the feature to tip over. However, FIGS. 7B and 7C illustrate exemplary contours with vertical contour coupling features that extend upward and/or downward while allowing currently-extruding cementitious material to remain on top of already extruded portions. Such contour coupling features may be formed for example, by following a sequence that includes an alternating pattern, such as an alternating pattern that repeats a sequence in alternating, opposite order. For example, an alternating pattern for forming a contour coupling feature may include alternating between a first sequence that includes one or more switchbacks followed by one or more elbows, and a second, opposite sequence that includes one or more elbows followed by one or more switchbacks.

Figure 7D:
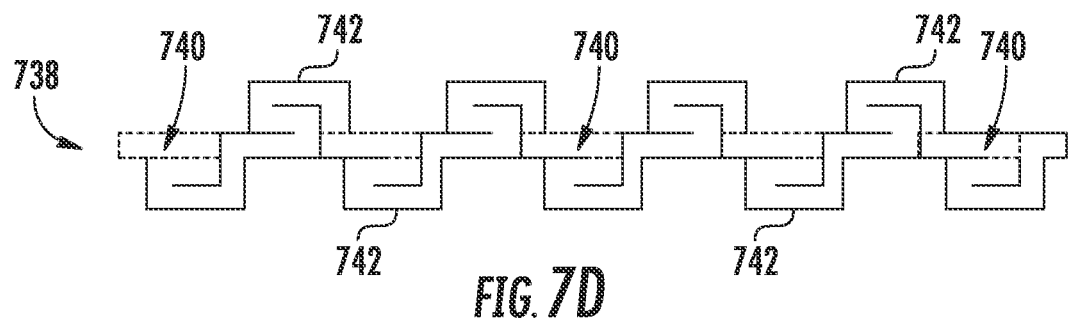
Figure 7E:
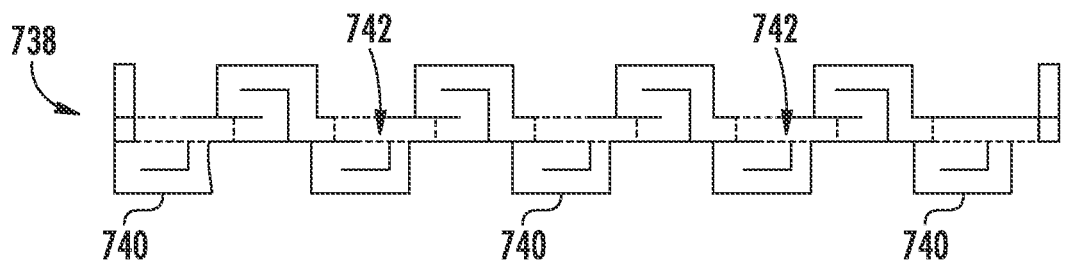
Figure 7F:
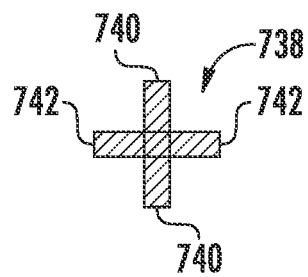
Figure 7G:
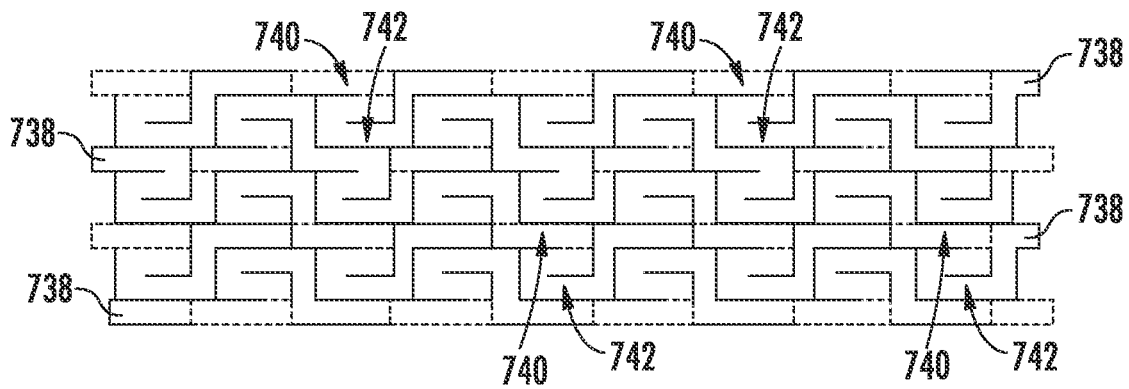

Now turning to FIGS. 7D-7G, in some embodiments a contour may include both lateral contour coupling features (e.g., contour coupling features extending laterally) and vertical contour coupling features (e.g., contour coupling features extending upward and/or downward). FIG. 7D shows a top view of an exemplary contour 738 that includes both vertical contour coupling features 740 and lateral contour coupling features 742. FIG. 7E shows a side view of the exemplary contour 738 shown in FIG. 7D, and FIG. 7F shows an end view of the exemplary contour 738 shown in FIGS. 7D and 7E. As shown in FIG. 7G, one or more contours or segments of a contour may include both vertical contour coupling features 740 and lateral contour coupling features 742 engaging with one another.

Figure 7H:
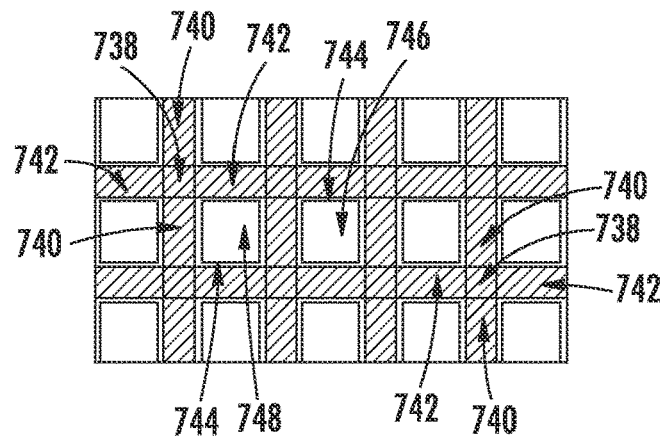
Figure 7I:
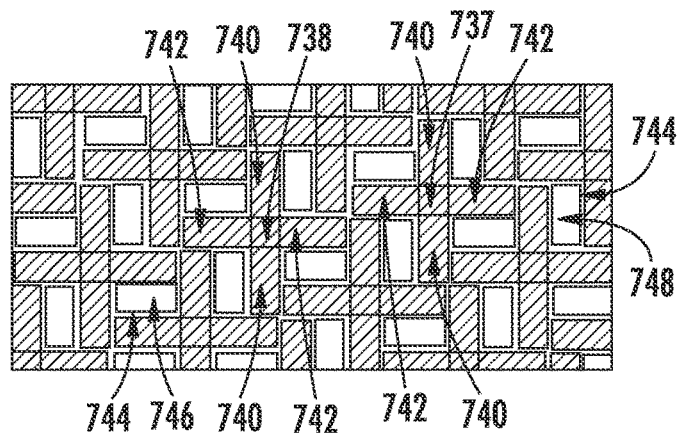
Figure 7J:
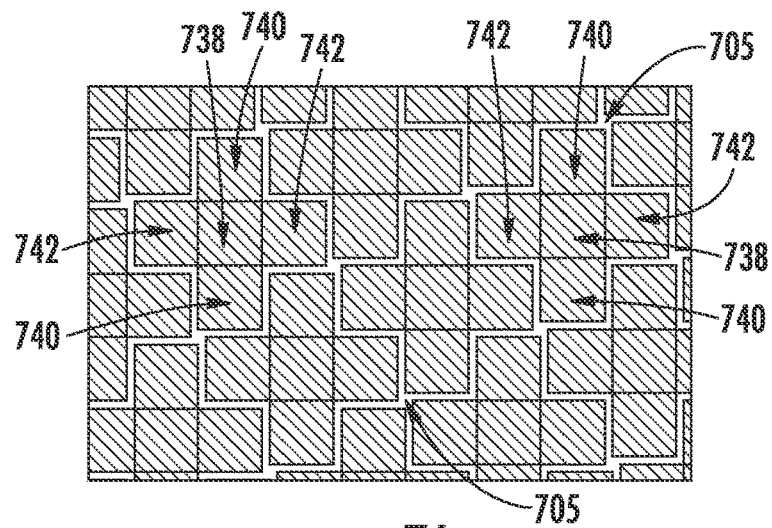

Now turning to FIGS. 7H-7J, exemplary engaging of adjacent contours and their respective contour coupling features are shown. As shown in FIG. 7H, one or more contours 738 or segments of a contour may include both vertical contour coupling features 740 and lateral contour coupling features 742 engaging with one another in a grid-like pattern. As shown in FIG. 7I, one or more contours 738 or segments of a contour may include both vertical contour coupling features 740 and lateral contour coupling features 742 engaging with one another in a herringbone-like pattern.

In some embodiments, as shown in FIG. 7H, the vertical contour coupling features 740 of a contour 738 may align with other vertical contour coupling features of another contour or segment of a contour located adjacently above and/or adjacently below the respective contour 738. The lateral contour coupling features 742 of the contour 738 may align with other lateral contour coupling features of another contour or segment of a contour located laterally adjacent to the respective contour 738. This configuration may provide one or more domains 744 bordered by vertical contour coupling features 740 opposite from one another and lateral contour coupling features 742 opposite from one another. In some embodiments, such plurality of domains 744 may be occupied by another contour 746 or portion of a contour. Alternatively, in some embodiments, the plurality of domains 744 may define a void volume 748 surrounded by one or more contours 738 and/or contour coupling features 740, 742.

In some embodiments, as shown in FIG. 7I, the vertical contour coupling features 740 may align with lateral contour coupling features 742 located laterally adjacent to the respective vertical contour coupling feature 740. Additionally, or in the alternative, the lateral contour coupling features 742 may align with vertical contour coupling features 740 located adjacently above and/or adjacently below the respective lateral contour coupling feature 742. This configuration may also provide one or more domains 744 bordered by vertical contour coupling features 740 on opposite sides of the plurality of domains 744 from one another and lateral contour coupling features 742 on opposite sides of the plurality of domains 744 from one another. In some embodiments, such plurality of domains 744 may be occupied by another contour 746 or portion of a contour. Alternatively, in some embodiments, the plurality of domains 744 may define a void volume 748 surrounded by one or more contours 738 and/or contour coupling features 740, 742.

In yet another embodiment, as shown in FIG. 7J, the contours 738 and their respective contour coupling features 740, 742 may be configured such that the vertical contour coupling features 740 may align with both other vertical contour coupling features 740 and other lateral contour coupling features 742 of another contour or segment of a contour 738. This configuration may provide for contours and/or contour coupling features 740, 742 adjacently abutting one another without one or more domains 744 between them, although it will be appreciated that some nominal space may exist where adjacently abutting contours and/or contour coupling features 740, 742 are not fully bonded to one another though interlayer crystallization of hydration products in the cementitious material. Alternatively, an adhesive formulation 705 may be provided within the space between contours 738.

Figure 9A:
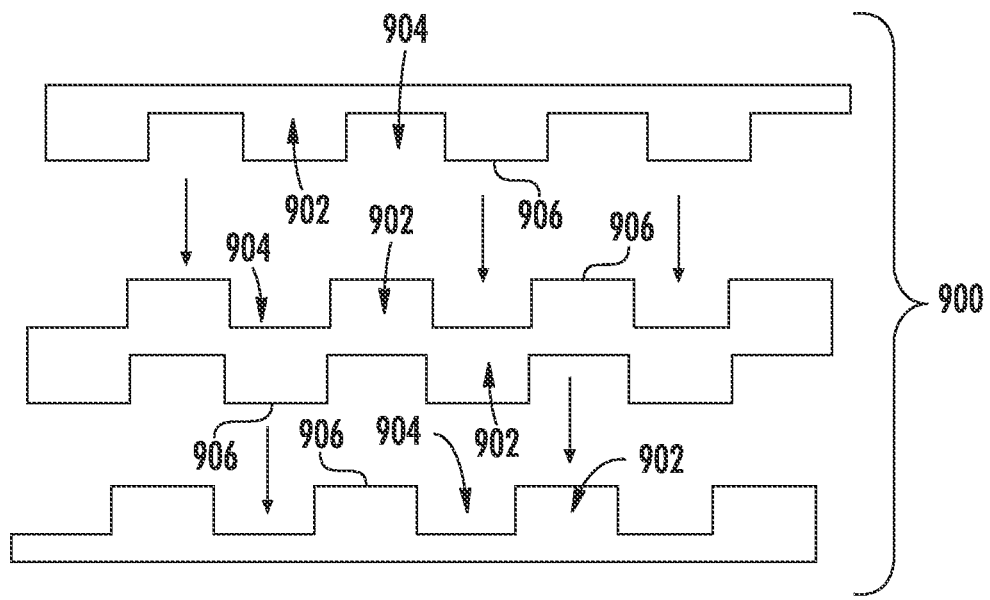
FIGS. 9A-9D schematically illustrate various exemplary shapes of contour coupling features.
Figure 9B:
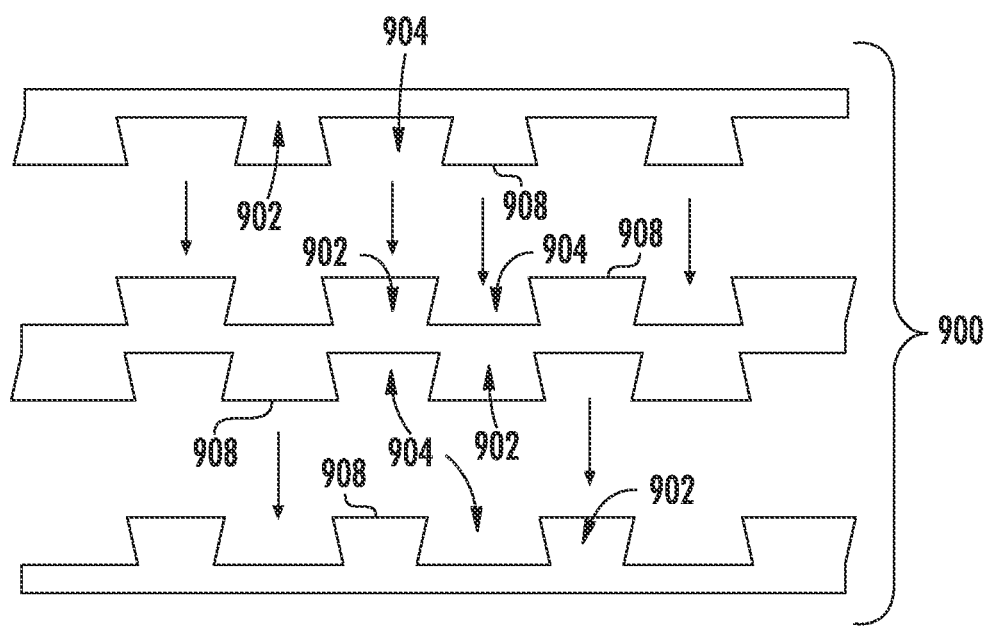
Figure 9C:
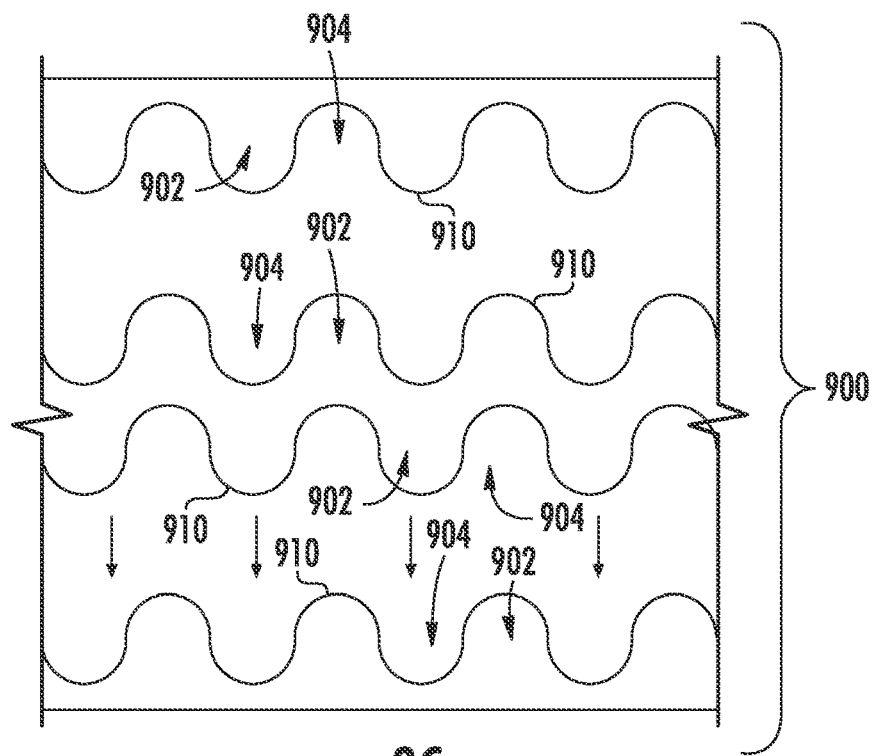
Figure 9D:
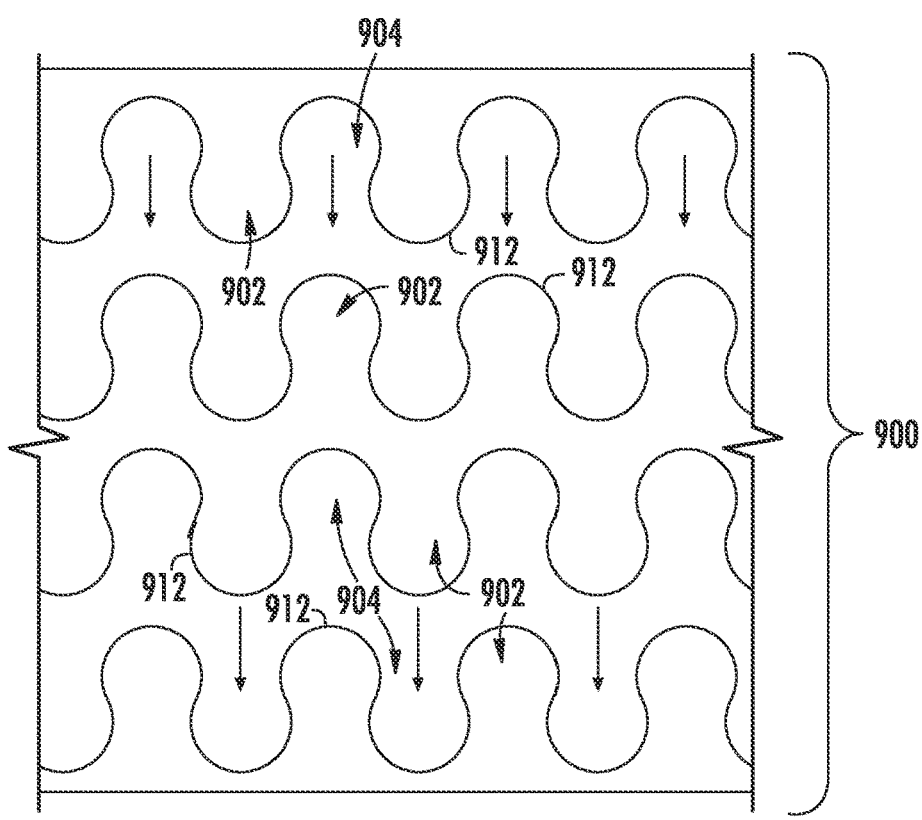

Now turning to FIGS. 9A-9D, cross-sectional exploded views of further exemplary contours 900 will be discussed. The views shown in FIGS. 9A-9D may be taken as top cross-sectional views, side cross-sectional views, or cross-sectional views from any desired angle. As shown, the exemplary contours 900 may include contour coupling features 902 in the form of dovetails configured to engage with corresponding dovetail pockets 904 so as to form dovetail joints between adjacent contours 900 or adjacent segments of a contour. As shown in FIGS. 9A and 9B, in some embodiments, a contour 900 may include contour coupling features 902 that have a polyhedral cross-sectional profile. As examples, the polyhedral cross-sectional profile of a contour coupling feature 902 may define a boxed dovetail 906 (FIG. 9A) or a wedged dovetail 908 (FIG. 9B). As shown in FIGS. 9C and 9D, in some embodiments, a contour 900 may include contour coupling features 902 that have a curvilinear cross-sectional profile. As examples, the curvilinear cross-sectional profile of a contour coupling feature 902 may define a wave dovetail 910 (FIG. 9C) or a lollipop dovetail 912 (FIG. 9D). It will be appreciated that numerous other dovetail configurations are contemplated, all of which are within the spirit and scope of the present disclosure. Further examples of dovetail configurations include key dovetails, hexagonal dovetails, arrowhead dovetails, heart dovetails, and dog-bone dovetails.

Now turning to FIGS. 10 through 12B, woven contours will be discussed.

Figure 10:
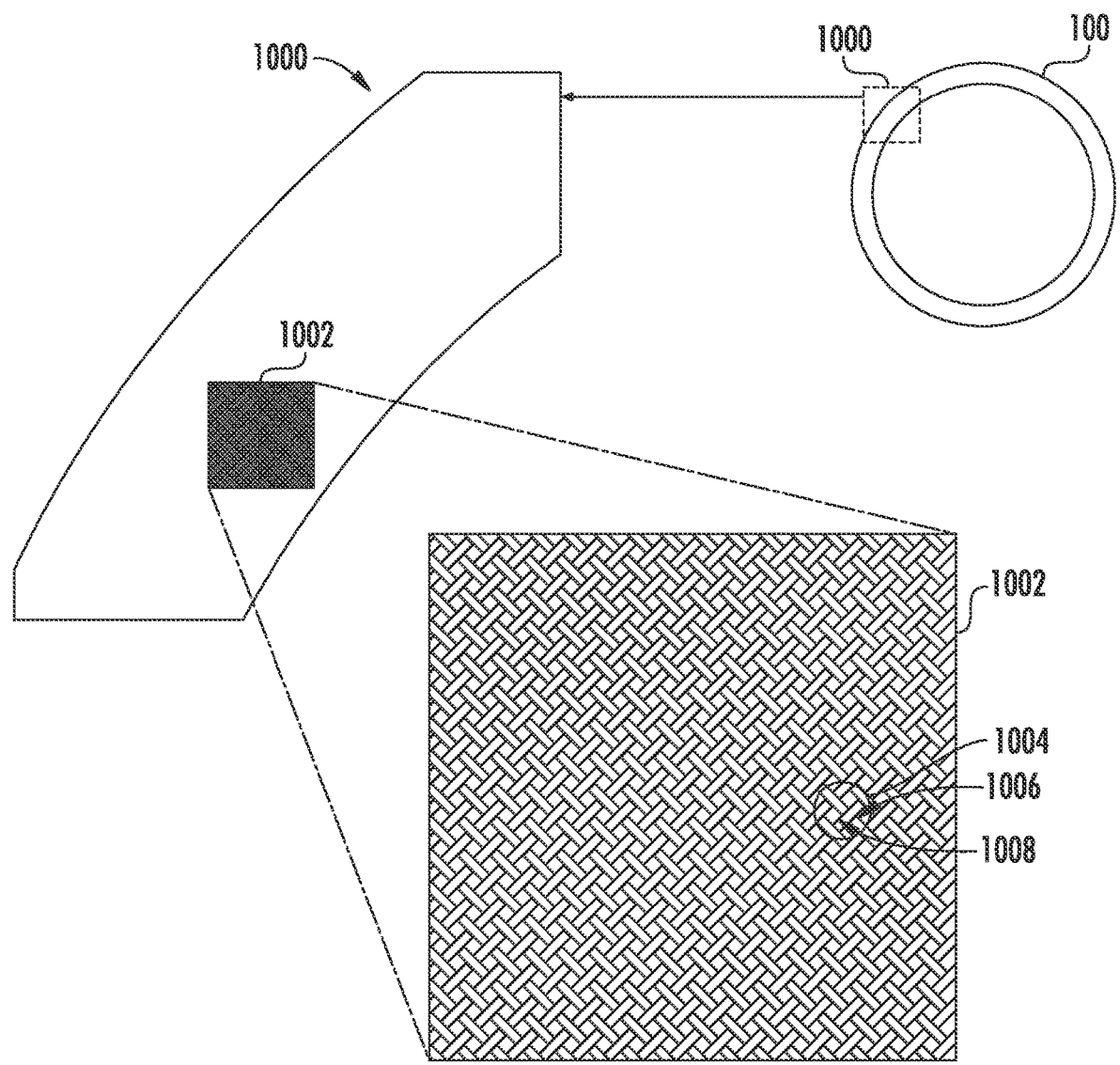
FIG. 10 schematically illustrates an enlarged top view of one or more exemplary woven contours.

FIG. 10 shows an enlarged partial top view 1000 of a cementitious structure 100. As shown, the cementitious structure 100 may include a woven contour 1002 and/or a series of woven contours. In some embodiments, the woven contours 1002 presently disclosed may include any of the contour coupling features described herein. In other embodiments, the woven contours 1002 may include intersecting contours 1004 whereby a first contour 1006 or a first segment of a contour overlaps or otherwise intersects a second contour 1008 or a second segment of a contour. Such intersections 1004 may themselves define a contour coupling feature. Exemplary woven contours 1002 may include any desired pattern. The woven contours 1002 may be formed using one or more printing tools 206 each following a respective toolpath corresponding to the woven contours 1002.

In some embodiments, woven contours 1002 may be provided without interrupting a flow of cementitious material to the one or more printing tools 206 and/or without interrupting a flow of cementitious material being extruded from the one or more printing tools when forming the woven contours 1002. For example, a woven contour may include one or more continuous contours provided without interrupting a flow of cementitious material. Such continuous contours may provide a continuous spiraling layer or series of layers. A woven contour may be provided using a single printing tool 206 or one or more printing tools 206 without interrupting a flow of cementitious material. Exemplary patterns for a woven contour included patterns which weave across an area of the cementitious structure in a manner that allows for even growth of the cementitious structure with the addition of sequential contours or continuation of one or more continuous contours. Alternatively, woven contours may be generally uneven, with uneven areas filled-in with subsequent contours. In some embodiments, a cementitious structure may include multiple layers of woven contours layered on top of one another. Additionally, or in the alternative, woven contours may be intermixed with other layers of cementitious material, such as contours that include other contour coupling features as described herein.

Figure 11A:
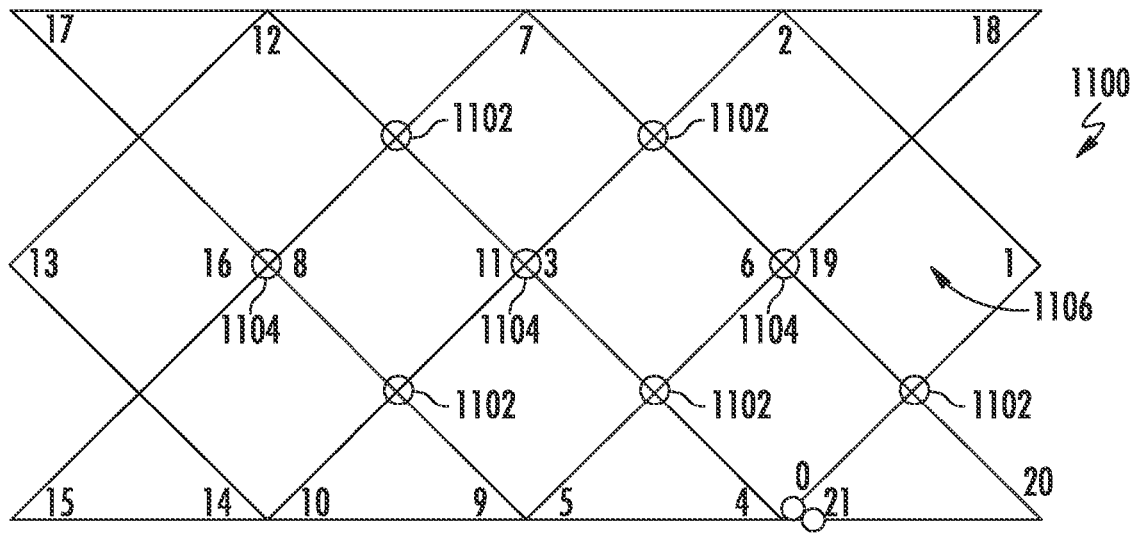
FIGS. 11A and 11B schematically illustrate exemplary toolpaths for forming woven contours.

FIG. 11A shows one exemplary toolpath 1100 for extruding a woven contour. The toolpath 1100 may be followed by one or more printing tools 206. The toolpath 1100 may begin at point 0 and may progress sequentially in number order. As shown, the toolpath 1100 includes 21 points; however, it will be appreciated that the sequence shown in the exemplary toolpath 1100 may be continued or extended to include any number of points depending on the size of the cementitious structure 100 being additively printed. The exemplary toolpath includes overlapping toolpath passes 1102 as well as intersecting toolpath passes 1104. When extruding cementitious material following the exemplary toolpath 1100, the cementitious material provides a woven contour with overlapping or intersecting portions thereof corresponding to the overlapping or intersecting toolpath passes 1102, 1104. The overlapping and/or intersecting portions of the contours may adjacently abut one another, and/or a domain 1106 may exist between adjacent portions of the contours. The extent to which a domain 1106 exists may depend on the geometry of the toolpath 1100 relative to the size of the cementitious material.

Figure 11B:
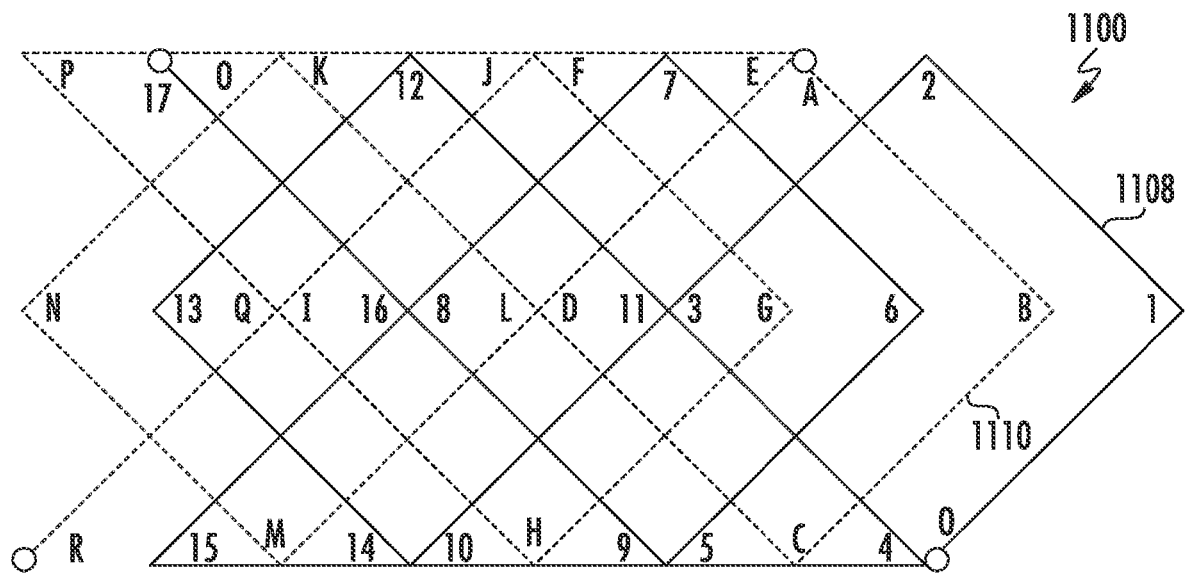

In some embodiments, as shown in FIG. 11B, sequential toolpaths 1100 or corresponding sequential contours or segments of a continuous contour may overlap one another with an offset. As an example, FIG. 11B shows a first toolpath 1108 and a second toolpath 1110 offset from the first toolpath 1108. The first toolpath 1108 and the second toolpath 1110 may be followed by one or more printing tools 206. For example, the first toolpath 1108 may be followed by a first printing tool 206 and the second toolpath 1110 may be followed by a second printing tool. The first toolpath 1108 may begin at point 0 and may progress sequentially in number order. The second toolpath may begin at point A and may progress sequentially in alphabetical order. The offset between the first toolpath 1108 and the second toolpath 1110 may be selected so as to provide additional overlapping and/or intersecting portions of the woven toolpath, which overlaps and intersections may include contour coupling features. The overlapping and intersecting contours 1004 may follow a serpentine path 704 as described with reference to FIGS. 7A-7J. For example, the overlapping and intersecting portions of a woven contour may include one or more switchbacks 708, 710 and/or one or more elbows 714, 716, as well as any other types of curves, corners, twists, turns, bends, loops, zig-zags, directional shifts, elevation shifts, double-backs, oscillations, undulations, and so forth. Additionally, or in the alternative, the offset between the first toolpath 1108 and the second toolpath 1110 may be selected so as to compensate for unevenness in the weaving pattern used to form the woven contours.

In some embodiments, the offset toolpaths 1108, 1110 may be followed by the respective one or more printing tools 206 with timing selected so as to provide a combination of overlapping and underlapping contours. For example, it will be appreciated that the portion of the first toolpath 1108 from point 2 to 3 may either overlap or underlap the portion of the second toolpath 1110 from point A to B, depending on which portion the respective printing tool 206 follows first. The respective printing tools 206 may progress along the respective toolpaths 1108, 1110 at different rates relative to one another at various portions of the toolpaths 1108, 1110 so as to provide for overlapping and/or underlapping as desired. In this manner, contours may be provided with an sequence of alternating overlapping and underlapping contours.

For example, the first toolpath 1108 may provide a first contour with sequence of alternating overlapping and underlapping with itself as well as a second contour corresponding to the second toolpath 1110. In some embodiments, when the first contour crosses with the second contour, the first contour may alternate between overlapping and underlapping the second contour. In some embodiments, when the second contour crosses the first contour, the second contour may alternate between overlapping and underlapping the first contour. To illustrate, from point 10 through point 14, the first toolpath 1108 may provide a first contour following the sequence: from point 10 to 11: "underlap second contour, overlap first contour, overlap second contour, intersection with first contour"; then from point 11 to 12: "overlap second contour, overlap first contour, underlap second contour, intersection with first contour"; then from point 12 to 13: "overlap second contour, underlap first contour, underlap second contour, intersection with first contour"; and then from point 13 to 14: "underlap second contour, underlap first contour, overlap second contour, intersection with first contour", and so on. To further illustrate, from point F through point J, the second toolpath 1110 may provide a second contour following the sequence: from point F to G: "underlap first contour, overlap second contour, overlap first contour, intersection with second contour"; then from point G to H: "overlap first contour, overlap second contour, underlap first contour, intersection with second contour"; then from point H to I: "overlap first contour, underlap second contour, underlap first contour, intersection with second contour"; and then from point I to J: "underlap first contour, underlap second contour, overlap first contour, intersection with second contour", and so on.

Figure 12A:
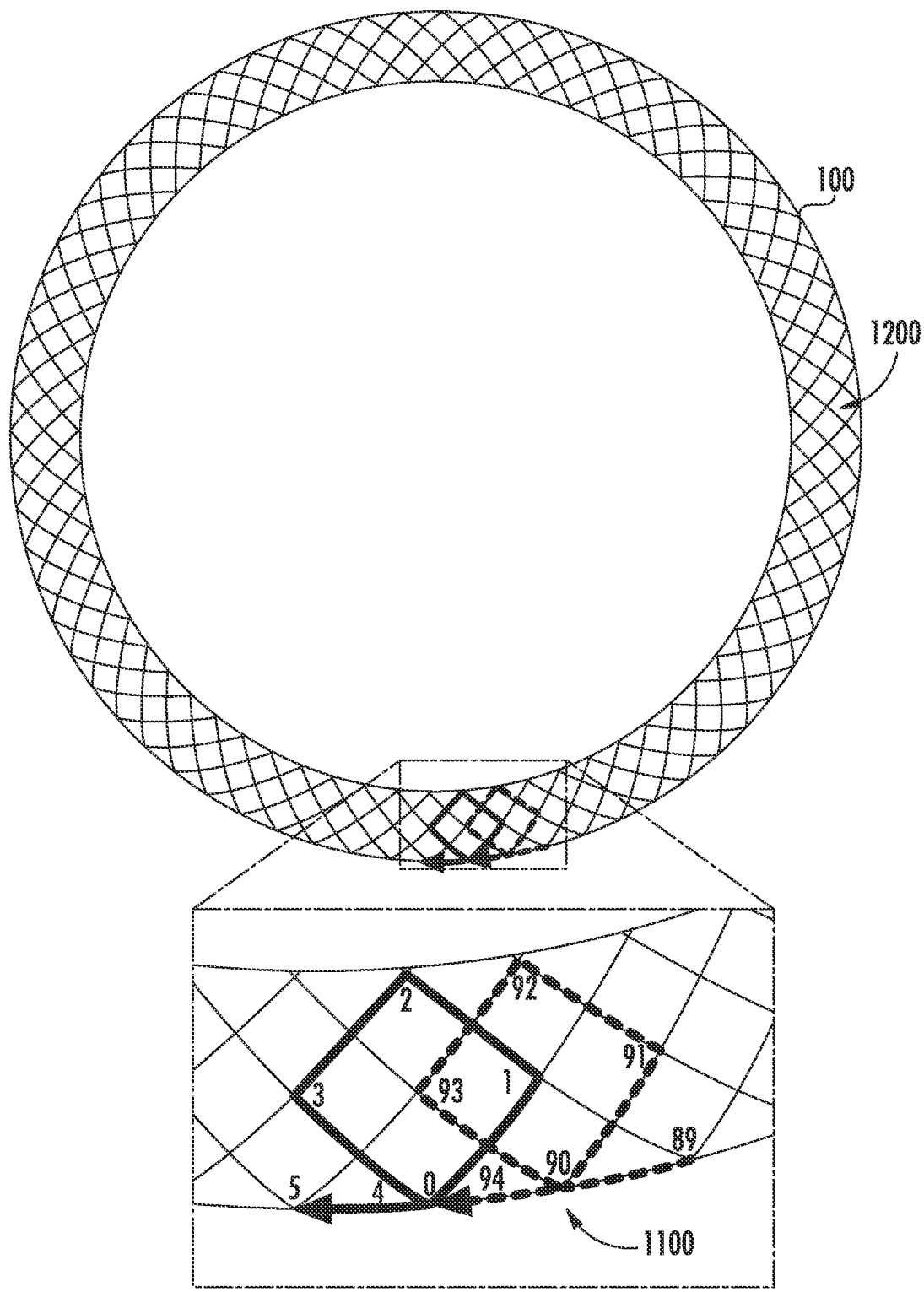
FIGS. 12A and 12B schematically illustrate further exemplary toolpaths for forming woven contours.
Figure 12B:
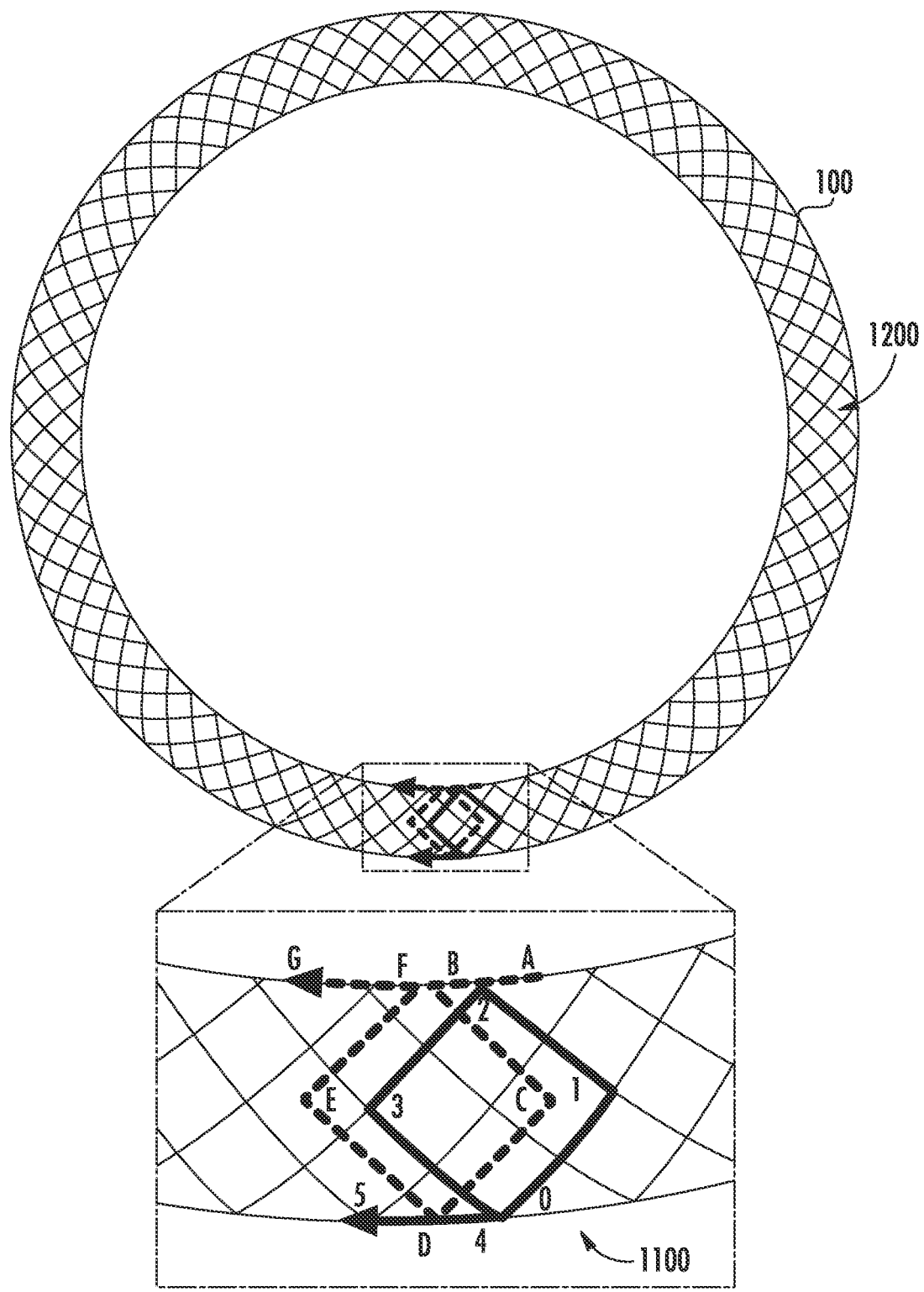

Now referring to FIGS. 12A and 12B, a toolpath 1100 configured to extrude a woven contour 1200 may be capable of circumnavigating an annular surface of a cementitious structure. In some embodiments, a woven contour 1200 may be capable of continuing indefinitely until a specified stopping point, such as completion of one or more portions of the cementitious structure 100. For example, a woven contour 1200 may include an annular woven contour that circumnavigates an annular surface of a cementitious structure. As another example, a woven contour 1200 may include a spiral woven contour that makes more than a full circumnavigation of an annular surface of a cementitious structure. In some embodiments, a woven contour 1200 may provide a continuous spiraling layer or series of layers.

Exemplary toolpaths 1100 for providing a woven contour 1200 that circumnavigates or spirals an annular surface may include one or more characteristics of the toolpaths 1100 described in FIGS. 11A and 11B (e.g., the first toolpath 1108 and/or the second toolpath 1110). As shown in FIG. 12A, the toolpath 1100 may include geometry selected to cause sequential layers of the woven contour to align starting points and end points as the contour sequentially circumnavigates the annular surface. Alternatively, the toolpath may include geometry selected to cause sequential layers of the woven contour to overlap as the contour sequentially spirals, applying one layer of the woven contour on top of another. In some embodiments, the woven contour may alternate between a first region 300 and a second region 302 of a cementitious structure 100, such as an outer perimeter region and an inner perimeter region, as discussed herein with reference to FIGS. 3A and 3B.

Figure 13A:
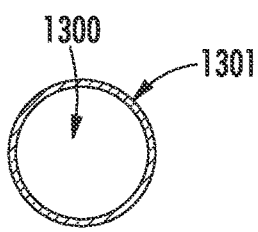
FIGS. 13A-13F schematically illustrate exemplary cross-sectional views of a cementitious extrudate.
Figure 13B:
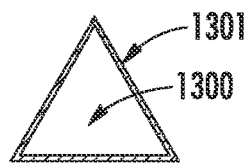
Figure 13C:
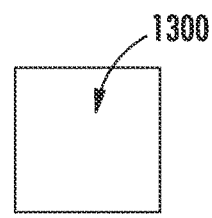
Figure 13D:
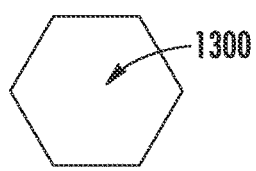
Figure 13E:
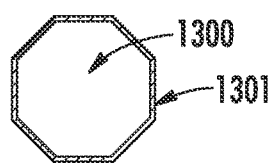
Figure 13F:
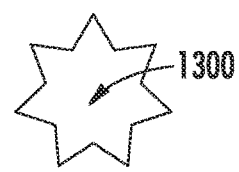

Now turning to FIGS. 13A-13H, exemplary cross-sectional profiles of a cementitious extrudate 222 will be discussed. A contour may include one or more cementitious extrudates having any desired cross-sectional profile. FIGS. 13A-13H illustrate some exemplary cross-sectional profiles, which are not to be limiting. Numerous other cross-sectional profiles are contemplated, all of which are within the spirit and scope of the present disclosure. Exemplary cross-sectional profiles of a cementitious extrudate 222 include a circle or oval shape (FIG. 13A), a triangle or polyhedral shape (FIG. 13B), a rectangular or quadrahedral shape (FIG. 13C), a hexagonal shape (FIG. 13D), an octagonal shape (FIG. 13E), or a star-polygonal shape (FIG. 13F). By way of example, FIGS. 13A and 13C show a contour 1300 coated with an adhesive formulation 1301, whereas FIGS. 13B, 13D, and 13F show a contour without an adhesive formulation 1301. However, it will be appreciated that the adhesive formulation 1301 is optional, and that a contour 1300 may be coated with an adhesive formulation 1301 regardless of the particular shape of the contour 1300.

Figure 13G:
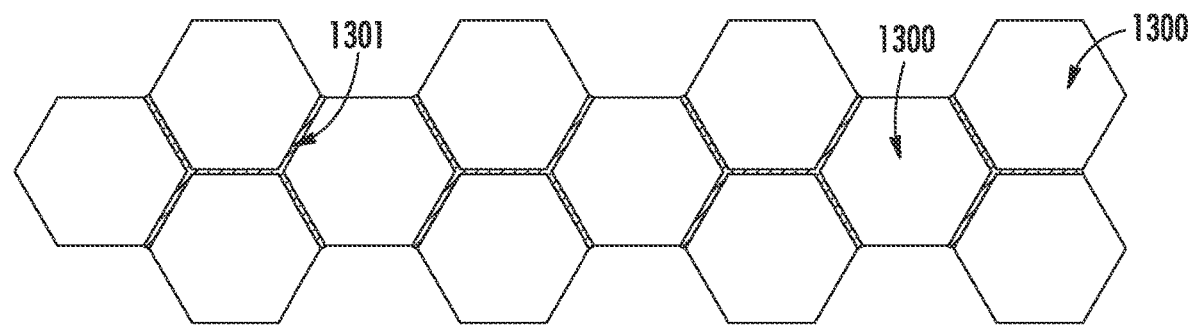
FIGS. 13G and 13H schematically illustrate exemplary cross-sectional views of interlocking cementitious extrudates.
Figure 13H:
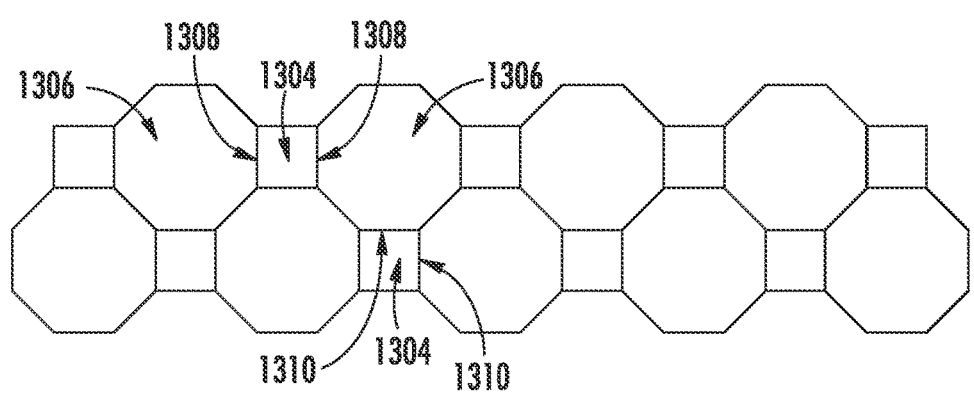

In some embodiments, as shown in FIGS. 13G and 13H, a cementitious extrudate 222 may include a cross-sectional profile such that one or more edges of the cementitious extrudate 222 are capable of engaging with one or more corresponding edges of an adjacent cementitious extrudate. For example, FIG. 13G shows one or more contours or segments of a contour 1300 with one or more edges 1302 thereof engaging with one or more corresponding edges of an adjacent contour or segment of a contour 1300. As another example, FIG. 13H shows one or more first contours or segments of a first contour 1304 and one or more second contours or segments of a second contour 1306, with one or more first edges 1308 of the first contour engaging with one or more corresponding second edges 1310 of an adjacent second contour 1306. FIG. 13H further shows one or more second edges 1308 of respective adjacent contours 1306 engaging with one another. By way of example, FIG. 13G shows contours engaging one another with an adhesive formulation 1301 between them, whereas FIG. 13H shows contours engaging without an adhesive formulation 1301. However, it will be appreciated that the adhesive formulation 1301 is optional when engaging contours with one another.

Now referring to FIG. 14, an exemplary control system 1400 for an additive printing device 200 will be described. An exemplary control system 1400 includes a controller 202 configured to communicate with an additive printing device 200 or one or more components thereof. For example, the controller 202 may communicate with one or more controllable components 1402, such a printing tool(s) 206, a cementitious material pump 212, a support member(s) 208, and or a drive motor 230. The controller 202 may also communicate with one or more sensors 1404, which may provide inputs that may be used by the controller 202 for controlling the controllable devices or otherwise operating the additive printing device 200. Exemplary sensors 1404 include positioning sensors, such as global positioning system (GPS) sensors, non-contact position sensors such as ultrasonic, infrared, or laser based positioning sensors, and the like.

The controller 202 may include one or more computing devices 1406, which may be located on or within an additive printing device 200, adjacent to an additive printing device 200, or at a remote location relative to the additive printing device 200. The one or more computing devices 1406 may include one or more processors 1408 and one or more memory devices 1410. The one or more processors 1408 may include any suitable processing device, such as a microprocessor, microcontroller, integrated circuit, logic device, and/or other suitable processing device. The one or more memory devices 1410 may include one or more computer-readable media, including but not limited to non-transitory computer-readable media, RAM, ROM, hard drives, flash drives, and/or other memory devices.

The one or more memory device 1410 may store information accessible by the one or more processors 1408, including machine-executable instructions 1412 that can be executed by the one or more processors 1408. The instructions 1412 may be any set of instructions which when executed by the one or more processors 1408 cause the one or more processors 1408 to perform operations. In some embodiments, the instructions 1412 may be configured to cause the one or more processors 1408 to perform operations for which the controller 202 and/or the one or more computing devices 1406 are configured. Such operations may include controlling one or more controllable components 1402, including, for example, one or more printing tools 206, a cementitious material pump 212, one or more support members 208, a drive motor 230. Such operations may additionally or alternatively include receiving inputs from one or more sensors 1404, and controlling the one or more controllable components 1402 based at least in part on the inputs from the one or more sensors 1404. Such operations may be carried out according to control commands provided by an additive printing control model 1414. The machine-executable instructions 1412 can be software written in any suitable programming language or can be implemented in hardware. Additionally, and/or alternatively, the instructions 1412 can be executed in logically and/or virtually separate threads on processors 1408.

The memory devices 1410 may store data 1416 accessible by the one or more processors 1408. The data 1416 can include current or real-time data, past data, or a combination thereof. The data 1416 may be stored in a data library 1418. As examples, the data 1416 may include data associated with or generated by an additive printing device 200, including data 1416 associated with or generated by a controller 202, one or more controllable components 1402, one or more sensors 1404, a computing device 1406, and/or an additive printing control model 1414. The data 1416 may also include other data sets, parameters, outputs, information, associated with additively printing a cementitious structure 100.

The one or more computing devices 1406 may also include a communication interface 1420, which may be used for communications with a communications network 1422 via wired or wireless communication lines 1424. The communication network 1422 may include, for example, a local area network (LAN), a wide area network (WAN), SATCOM network, VHF network, a HF network, a Wi-Fi network, a WiMAX network, a gatelink network, and/or any other suitable communications network for transmitting messages to and/or from the controller 202 across the communication lines 1424. The communication interface 1420 may allow the computing device 1406 to communicate with one or more sensors 1404 and/or with one or more controllable components 1402 of a control system 1400. The communication interface 1420 may additionally allow the computing device 1406 to communicate with the other components of the additive printing device 200 and/or other equipment or machinery associated with constructing a cementitious structure 100.

The communication interface 1420 may additionally or alternatively allow the computing device 1406 to communicate with one or more external resources 1426, such as a server 1428 or a data warehouse 1430. As an example, at least a portion of the data 1416 may be stored in the data warehouse 1430, and the server 1428 may be configured to transmit data 1416 from the data warehouse 1430 to the computing device 1406, and/or to receive data 1416 from the computing device 1406 and to store the received data 1416 in the data warehouse 1430 for further purposes. The server 1428 and/or the data warehouse 1430 may be implemented as part of an additive printing control system 1400. The communication interface 1420 may include any suitable components for interfacing with one or more network(s), including for example, transmitters, receivers, ports, controllers, antennas, and/or other suitable components. The communication lines 1424 of communication network 1422 may include a data bus or a combination of wired and/or wireless communication links.

Figure 14:
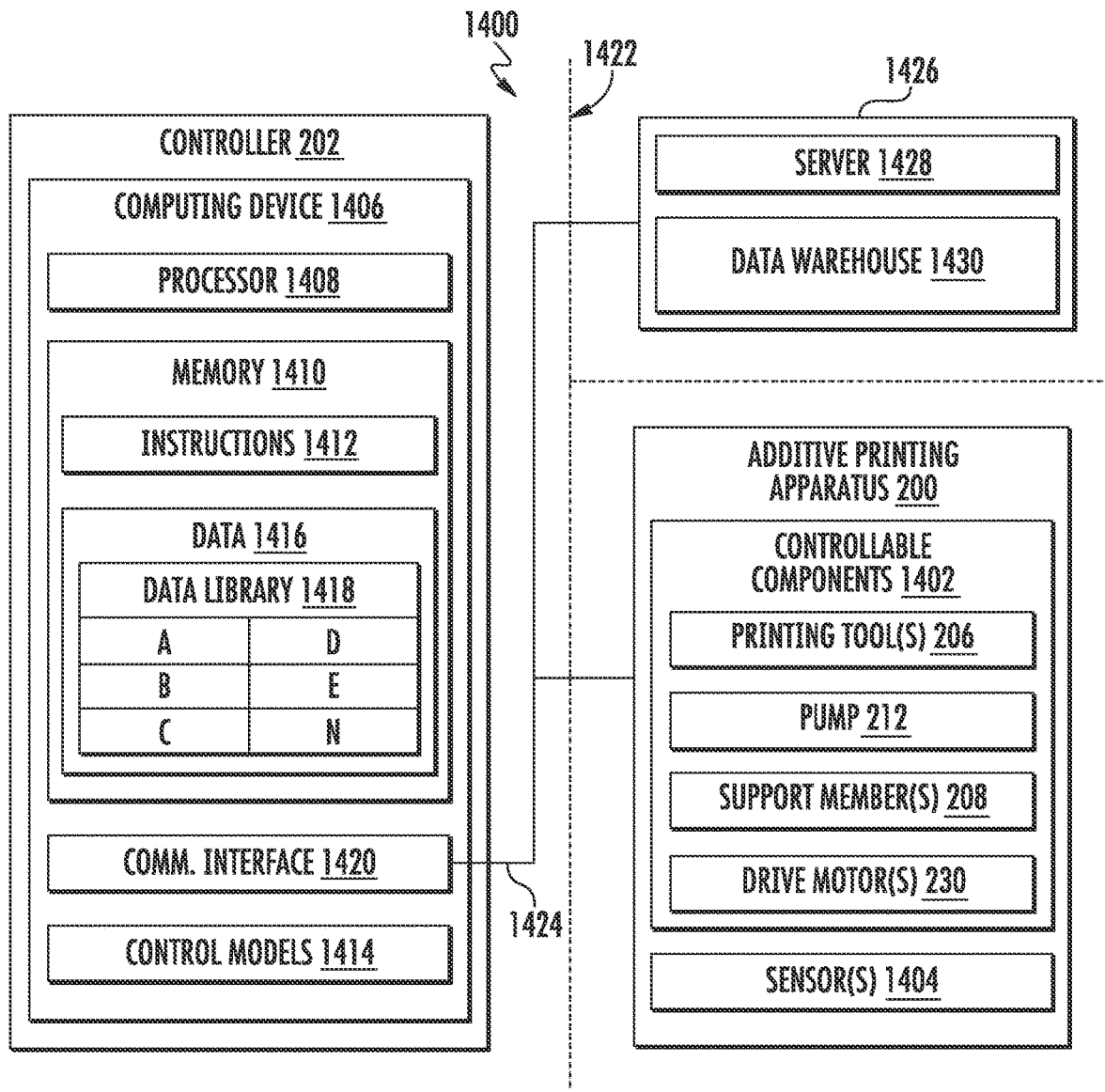
FIG. 14 shows a block diagram of an exemplary controller of an additive printing device.
Figure 15B:
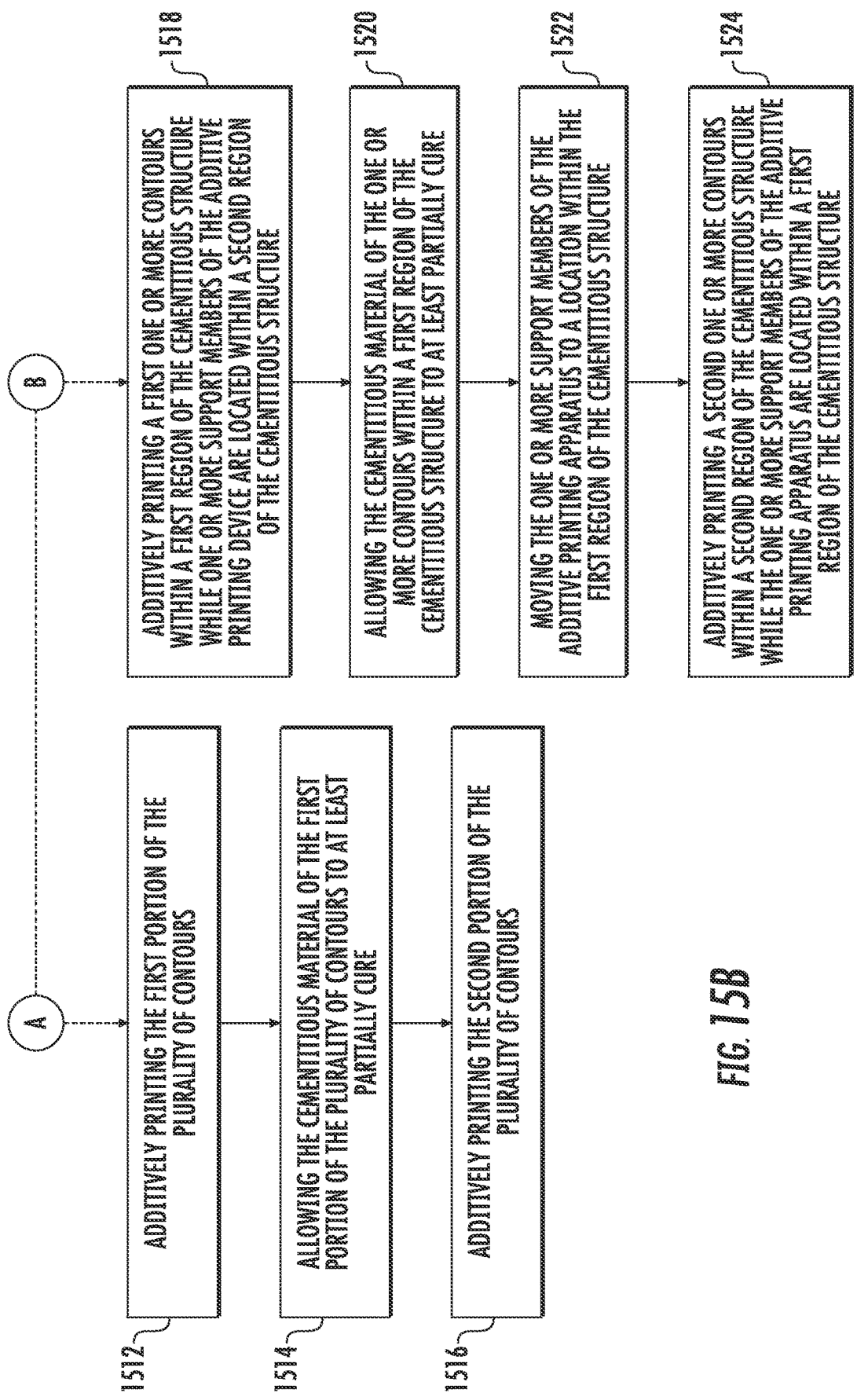
Figure 15C:
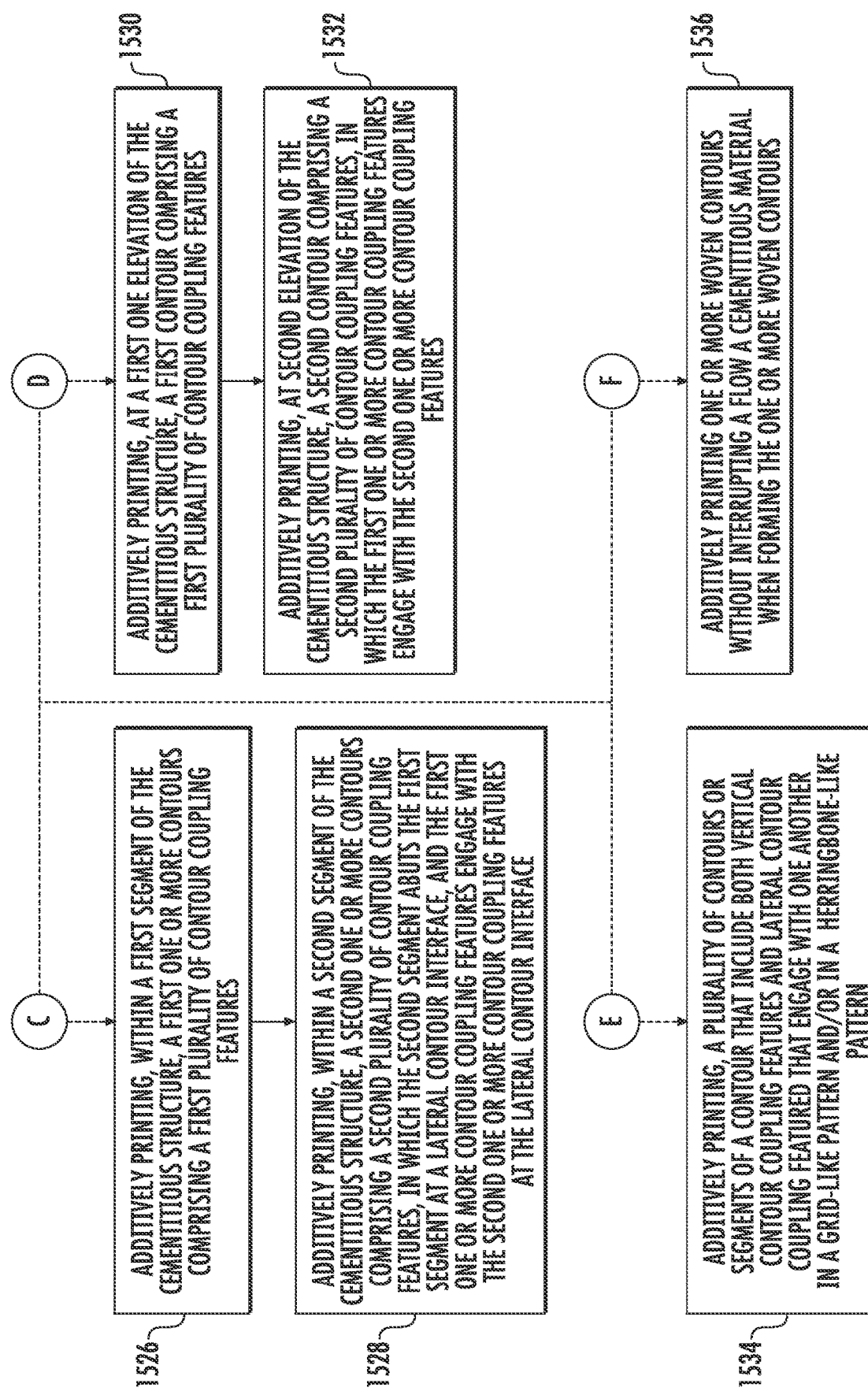
Figure 15D:
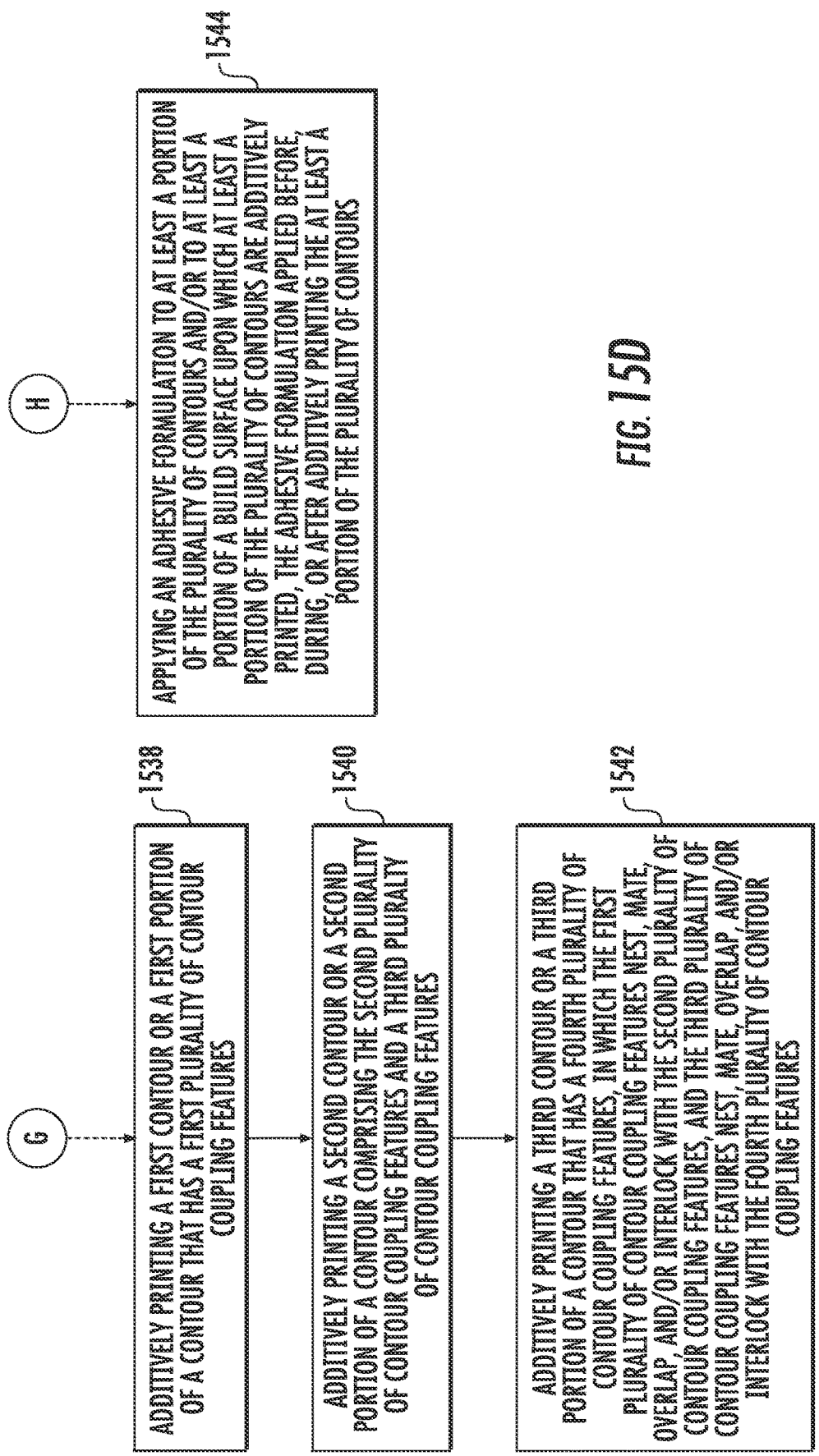

Still referring to FIG. 14, an exemplary controller 202 may include one or more additive printing control models 1414 configured to control various operating parameters and/or operating conditions pertaining to the additive printing device 200. An exemplary additive printing control model 1414 may be configured to output one or more toolpaths for one or more printing tools 206 based at least in part on the configuration of the cementitious structure 100 to be additively printed. The controller 202 may transmit a series of outputs that include one or more control commands to the one or more controllable components 1402. The outputs that include the control commands may be routed from the controller 202 to the one or more controllable components 1402 via the communication interface 1420.

Now turning to FIGS. 15A-15D, exemplary methods of additively printing cementitious structures will be discussed. The cementitious structure may include at least a portion of a tower configured to support a wind turbine, or any other cementitious structure. An exemplary method 1500 includes additively printing, via an additive printing device 200, one or more contours comprising a cementitious material so as to form a cementitious structure in a layer by layer manner such that a first portion of the one or more contours comprises a first plurality of contour coupling features that engage with a second plurality of contour coupling features of a second portion of the one or more contours 1502. In some embodiments, the cementitious material of the second portion of the one or more contours may flow up to and/or against the first portion of the one or more contours. Additionally, or in the alternative, the cementitious material of the second plurality of contour coupling features may flow into spaces defined by the first plurality of contour coupling features and/or around the first plurality of contour coupling features.

The first plurality of contour coupling features and/or the second plurality of contour coupling features may include a serpentine path that has one or more switchbacks and/or one or more elbows. In some embodiments, additively printing the one or more contours may include extruding cementitious material so as to provide a contour that follows a serpentine path while allowing currently-extruding cementitious material to remain on top of already extruded cementitious material 1504. The first plurality of contour coupling features and/or the second plurality of contour coupling features comprise one or more vertical contour coupling features and one or more lateral contour coupling features. The contour coupling features may include dovetails and dovetail pockets, with the dovetails engaging with corresponding dovetail pockets so as to form dovetail joints between adjacent contours or adjacent segments of a contour. The first portion of the one or more contours may have a first slope, and the second portion of the one or more contours may have a second slope, and the second slope may differ from the first slope. The first portion of the one or more contours may include a first plurality of contours that have a positive slope, and the second portion of the one or more contours may include a second plurality of contours that have a negative slope, with at least some of the first plurality of contours intersecting at least some of the second plurality of contours.

In some embodiments, additively printing the one or more contours 1502 may include forming a cementitious extrudate at least in part by extruding cementitious material from one or more nozzles of the additive printing device 1506. In some embodiments, additively printing the one or more contours may include receiving, via an additive printing device, machine-executable instructions from a print controller 1508, and orienting, via a robotic arm, one or more nozzles of the additive printing device with respect to a toolpath while extruding the cementitious material from the one or more nozzles, in which the orienting and the extruding performed according to machine-executable instructions 1510.

In some embodiments, additively printing the one or more contours 1502 may additionally or alternatively include additively printing the first portion of the one or more contours 1512, allowing the cementitious material of the first portion of the one or more contours to at least partially cure 1514, and additively printing the second portion of the one or more contours 1516.

In some embodiments, additively printing the one or more contours 1502 may additionally or alternatively include additively printing a first one or more contours within a first region of the cementitious structure while one or more support members of the additive printing device are located within a second region of the cementitious structure 1518, allowing the cementitious material of the one or more contours within a first region of the cementitious structure to at least partially cure 1520, moving the one or more support members of the additive printing device to a location within the first region of the cementitious structure 1522, and additively printing a second one or more contours within the second region of the cementitious structure while the one or more support members of the additive printing device are located within the first region of the cementitious structure 1524.

In some embodiments, additively printing the one or more contours 1502 may additionally or alternatively include additively printing, within a first segment of the cementitious structure, a first one or more contours comprising a first plurality of contour coupling features 1526, and additively printing, within a second segment of the cementitious structure, a second one or more contours comprising a second plurality of contour coupling features 1528, in which the second segment abuts the first segment at a lateral contour interface, and the first one or more contour coupling features engage with the second one or more contour coupling features at the lateral contour interface. The first one or more contours of the first segment may have a first slope, and the second one or more contours of the second segment have a second slope, with the second slope differing from the first slope. The first one or more contours may include a first plurality of contours that have a positive slope, and the second one or more contours may include a second plurality of contours that have a negative slope, with each of the first plurality of contours intersecting each of the second plurality of contours In some embodiments, additively printing the plurality of contours 1502 may include additively printing, at a first elevation of the cementitious structure, a first contour comprising a first plurality of contour coupling features 1530, and additively printing, at a second elevation of the cementitious structure, a second contour comprising a second plurality of contour coupling features 1532, in which the first one or more contour coupling features engage with the second one or more contour coupling features. The first contour may have a first angle relative to a normal line, and the second contour may have a second angle relative to a normal line, with the second angle differing from the first angle. Additionally, the first contour may intersect the second contour along a vertical contour interface.

In some embodiments, additively printing the plurality of contours may include additively printing one or more contours or segments of a contour that include both vertical contour coupling features and lateral contour coupling features that engage with one another in a grid-like pattern and/or in a herringbone-like pattern 1534. The grid-like pattern and/or the herringbone-like pattern may include one or more domains bordered by vertical contour coupling features opposite from one another and lateral contour coupling features opposite from one another, and the plurality of domains may include a void volume or another contour.

In some embodiments, additively printing the plurality of contours may additionally or alternatively include additively printing one or more woven contours without interrupting a flow of cementitious material when forming the one or more woven contours 1536.

In some embodiments, additively printing the plurality of contours 1502 may additionally or alternatively include additively printing a first contour or a first portion of a contour comprising the first plurality of contour coupling features 1538, additively printing a second contour or a second portion of a contour comprising the second plurality of contour coupling features and a third plurality of contour coupling features 1540, additively printing a third contour or a third portion of a contour comprising a fourth plurality of contour coupling features 1542, in which the first plurality of contour coupling features engage with the second plurality of contour coupling features, and the third plurality of contour coupling features engage with the fourth plurality of contour coupling features.

In some embodiments, additively printing the plurality of contours 1502 may additionally or alternatively include applying an adhesive formulation to at least a portion of the plurality of contours and/or to at least a portion of a build surface upon which at least a portion of the plurality of contours are additively printed 1544. The adhesive formulation applied before, during, or after additively printing the at least a portion of the plurality of contours.

This written description uses examples to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of manufacturing a cementitious structure, the method comprising:
   additively printing, via an additive printing device, one or more contours comprising a cementitious material so as to form a cementitious structure in a layer by layer manner such that a first portion of the one or more contours comprises a first plurality of contour coupling features that engage with a second plurality of contour coupling features of a second portion of the one or more contours, wherein additively printing the one or more contours comprises:
   additively printing a first portion of the one or more contours within a first region of the cementitious structure while one or more support members of the additive printing device are located within a second region of the cementitious structure;
   allowing the cementitious material of the first portion of the one or more contours within the first region of the cementitious structure to at least partially cure;
   moving the one or more support members of the additive printing device to a location within the first region of the cementitious structure, and
   additively printing a second portion of the one or more contours within the second region of the cementitious structure while the one or more support members of the additive printing device are located within the first region of the cementitious structure.

2. The method of claim 1, comprising:
   applying an adhesive formulation to at least a portion of the one or more contours and/or to at least a portion of a build surface upon which at least a portion of the one or more contours are additively printed, the adhesive formulation applied before, during, or after additively printing the at least a portion of the one or more contours.

3. The method of claim 1, wherein additively printing the one or more contours comprises:
receiving, via the additive printing device, machine-executable instructions from a print controller, and
orienting, via a robotic arm, one or more nozzles of the additive printing device with respect to a toolpath while extruding the cementitious material from the one or more nozzles, the orienting and the extruding performed according to machine-executable instructions.

4. The method of claim 1, wherein additively printing the one or more contours comprises:
additively printing, within a first segment of the cementitious structure, a first one or more contours comprising a third plurality of contour coupling features, and
additively printing, within a second segment of the cementitious structure, a second one or more contours comprising a fourth plurality of contour coupling features;
wherein the second segment abuts the first segment at a lateral contour interface, and the third one or more contour coupling features engage with the fourth one or more contour coupling features at the lateral contour interface.

5. The method of claim 1, wherein the first portion of the one or more contours has a first slope, and the second portion of the one or more contours has a second slope, the second slope differing from the first slope.

6. The method of claim 5, wherein the first portion of the one or more contours comprises a first plurality of contours that have a positive slope, and the second portion of the one or more contours comprises a second plurality of contours that have a negative slope, at least some of the first plurality of contours intersecting at least some of the second plurality of contours.

7. The method of claim 1, wherein additively printing the one or more contours comprises:
additively printing, at a first elevation of the cementitious structure, a first contour comprising a first plurality of contour coupling features, and
additively printing, at a second elevation of the cementitious structure, a second contour comprising a second plurality of contour coupling features;
wherein the first plurality of contour coupling features engage with the second plurality of contour coupling features.

8. The method of claim 7, wherein the first contour has a first angle relative to a normal line, and the second contour has a second angle relative to the normal line, the second angle differing from the first angle.

9. The method of claim 1, wherein the cementitious material of the second portion of the one or more contours flows up to and/or against the first portion of the one or more contours; and/or wherein the cementitious material of the second plurality of contour coupling features flows into spaces defined by the first plurality of contour coupling features and/or around the first plurality of contour coupling features.

10. The method of claim 1, wherein the first plurality of contour coupling features and/or the second plurality of contour coupling features comprise a serpentine path having one or more switchbacks and/or one or more elbows.

11. The method of claim 1, wherein additively printing the one or more contours comprises:
additively printing a first contour or a first portion of a contour comprising the first plurality of contour coupling features;
additively printing a second contour or a second portion of a contour comprising the second plurality of contour coupling features and a third plurality of contour coupling features, and
additively printing a third contour or a third portion of a contour comprising a fourth plurality of contour coupling features;
wherein the first plurality of contour coupling features engage with the second plurality of contour coupling features, and the third plurality of contour coupling features engage with the fourth plurality of contour coupling features.

12. The method of claim 1, wherein additively printing the one or more contours comprises:
extruding cementitious material so as to provide a contour that follows a serpentine path while allowing currently-extruding cementitious material to remain on top of already extruded cementitious material.

13. A method of manufacturing a cementitious structure, the method comprising:
additively printing, via an additive printing device, one or more contours comprising a cementitious material so as to form a cementitious structure in a layer by layer manner such that a first portion of the one or more contours comprises a first plurality of contour coupling features that engage with a second plurality of contour coupling features of a second portion of the one or more contours, wherein the first plurality of contour coupling features and/or the second plurality of contour coupling features comprise one or more vertical contour coupling features and one or more lateral contour coupling features.

14. The method of claim 13, wherein additively printing the one or more contours comprises:
additively printing one or more contours or segments of a contour that include both vertical contour coupling features and lateral contour coupling features that engage with one another in a grid-like pattern and/or in a herringbone-like pattern.

15. The method of claim 14, wherein the grid-like pattern and/or the herringbone-like pattern comprises one or more domains comprising a void volume or another contour.

16. The method of claim 13, wherein the contour coupling features include dovetails and dovetail pockets, the dovetails engaging with corresponding dovetail pockets so as to form dovetail joints between adjacent contours or adjacent segments of a contour.

17. A method of manufacturing a cementitious structure, the method comprising:
additively printing, via an additive printing device, one or more contours comprising a cementitious material so as to form a cementitious structure in a layer by layer manner such that a first portion of the one or more contours comprises a first plurality of contour coupling features that engage with a second plurality of contour coupling features of a second portion of the one or more contours, wherein additively printing the one or more contours comprises:
additively printing one or more woven contours without interrupting a flow of cementitious material when forming the one or more woven contours.

* * * * *